US012632476B2

(12) United States Patent
Mandal et al.

(10) Patent No.: US 12,632,476 B2
(45) Date of Patent: May 19, 2026

(54) APPARATUSES, METHODS, AND COMPUTER PROGRAM PRODUCTS FOR PROVIDING PREDICTIVE INFERENCES RELATED TO A GRAPH REPRESENTATION OF DATA VIA AN APPLICATION PROGRAMMING INTERFACE

(71) Applicant: ATLASSIAN PTY LTD, Sydney (AU)

(72) Inventors: Atri Mandal, Bengaluru (IN); Shashank Rao, Noida (IN); Mayank Sawhney, Bengaluru (IN)

(73) Assignee: ATLASSIAN PTY, LTD., Sydney (AU)

( * ) Notice: Subject to any disclaimer, the term of this patent is extended or adjusted under 35 U.S.C. 154(b) by 84 days.

(21) Appl. No.: 18/394,564

(22) Filed: Dec. 22, 2023

(65) Prior Publication Data

US 2025/0209094 A1     Jun. 26, 2025

(51) Int. Cl.
*G06F 16/248* (2019.01)
*G06F 16/28* (2019.01)

(52) U.S. Cl.
CPC .......... *G06F 16/288* (2019.01); *G06F 16/248* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 2023/0342585 A1* | 10/2023 | Mogoreanu | G06F 16/90335 |
| 2024/0071222 A1* | 2/2024 | Sun | G06F 16/35 |
| 2024/0121125 A1* | 4/2024 | Blair | G06F 16/345 |
| 2024/0203569 A1* | 6/2024 | Zhang | G06F 16/35 |
| 2024/0249426 A1* | 7/2024 | Tian | G06F 16/95 |
| 2025/0065907 A1* | 2/2025 | Narayanan | G06F 16/35 |

* cited by examiner

*Primary Examiner* — Son T Hoang
(74) *Attorney, Agent, or Firm* — Alston & Bird LLP

(57) ABSTRACT

Methods, apparatuses, or computer program products disclosed herein provide for receiving an API object via a communication channel, applying a machine learning model to (i) the API object and (ii) one or more graph embedding structures for a portion of graph data to generate one or more predictive inferences related to the API object, and initiating a resolution action related to the API object based at least in part on the one or more predictive inferences.

20 Claims, 15 Drawing Sheets

100

300

Graphical Data Structure 109

Graphical Representation Apparatus 120

Deep Learning Model 121

Graph Embedding Structure 302

Machine Learning Model(s) 111

Predictive Inference(s) 304

600

Graph Embedding Structure 302

Deep Learning Model 121

Graph Feature Set 602

Graphical Data Structure 109

700

900

950
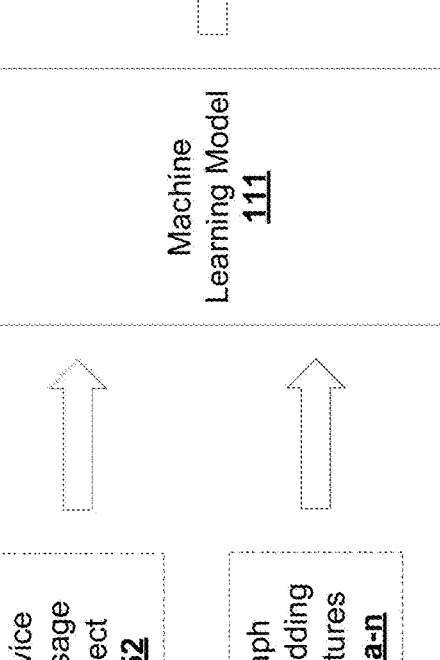
FIG. 9B

1000

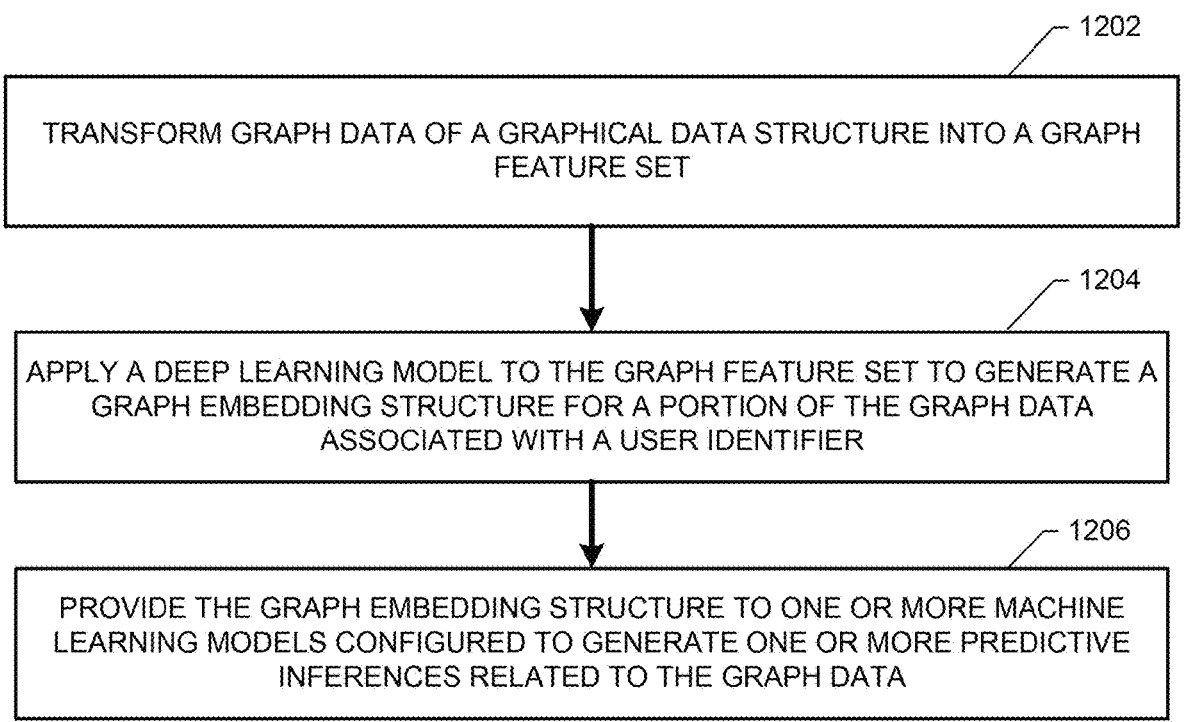

1202

TRANSFORM GRAPH DATA OF A GRAPHICAL DATA STRUCTURE INTO A GRAPH FEATURE SET

1204

APPLY A DEEP LEARNING MODEL TO THE GRAPH FEATURE SET TO GENERATE A GRAPH EMBEDDING STRUCTURE FOR A PORTION OF THE GRAPH DATA ASSOCIATED WITH A USER IDENTIFIER

1206

PROVIDE THE GRAPH EMBEDDING STRUCTURE TO ONE OR MORE MACHINE LEARNING MODELS CONFIGURED TO GENERATE ONE OR MORE PREDICTIVE INFERENCES RELATED TO THE GRAPH DATA

RECEIVE AN API OBJECT VIA A COMMUNICATION CHANNEL

1304

APPLY A MACHINE LEARNING MODEL TO THE API OBJECT AND/OR ONE OR MORE GRAPH EMBEDDING STRUCTURES TO GENERATE ONE OR MORE PREDICTIVE INFERENCES RELATED TO THE API OBJECT

1306

INITIATE A RESPONSE ACTION RELATED TO THE API OBJECT BASED AT LEAST IN PART ON THE ONE OR MORE PREDICTIVE INFERENCES

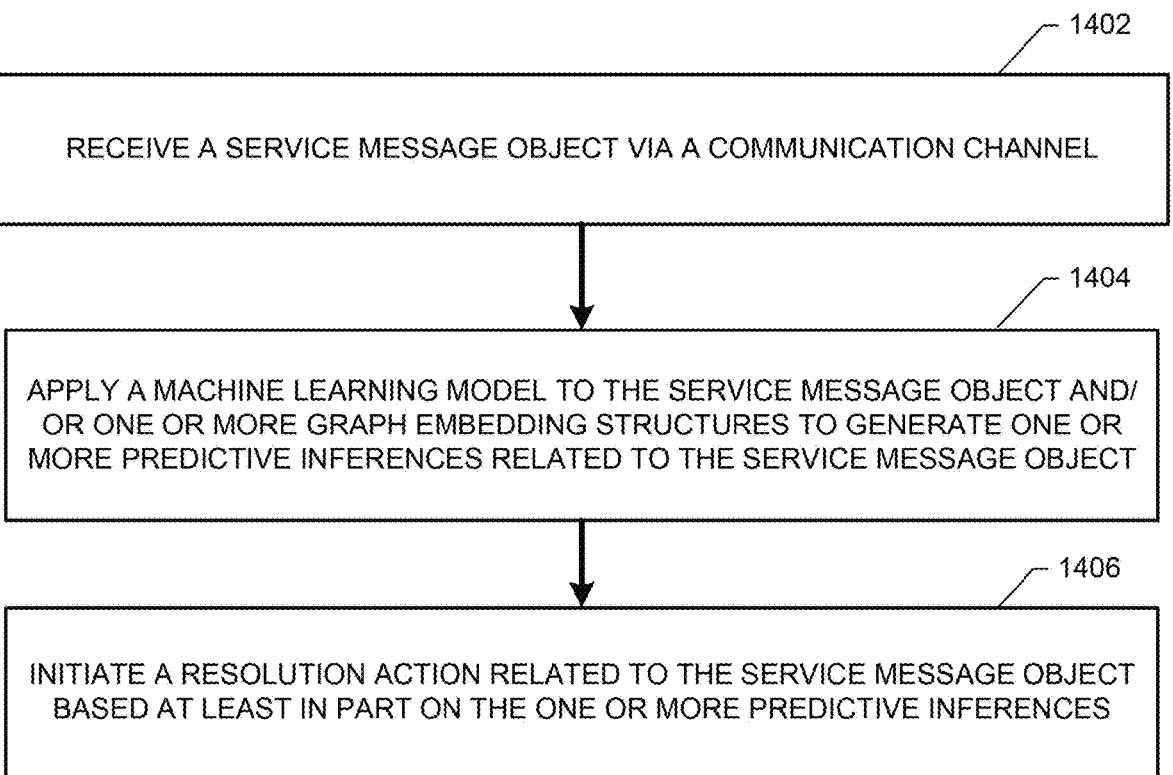

RECEIVE A SERVICE MESSAGE OBJECT VIA A COMMUNICATION CHANNEL

1402

APPLY A MACHINE LEARNING MODEL TO THE SERVICE MESSAGE OBJECT AND/ OR ONE OR MORE GRAPH EMBEDDING STRUCTURES TO GENERATE ONE OR MORE PREDICTIVE INFERENCES RELATED TO THE SERVICE MESSAGE OBJECT

1404

INITIATE A RESOLUTION ACTION RELATED TO THE SERVICE MESSAGE OBJECT BASED AT LEAST IN PART ON THE ONE OR MORE PREDICTIVE INFERENCES

APPARATUSES, METHODS, AND COMPUTER PROGRAM PRODUCTS FOR PROVIDING PREDICTIVE INFERENCES RELATED TO A GRAPH REPRESENTATION OF DATA VIA AN APPLICATION PROGRAMMING INTERFACE

BACKGROUND

It is often difficult to manage and/or support components of a server system in which inputs and/or components of the server system dynamically change. Through applied effort, ingenuity, and innovation, these identified deficiencies and problems have been solved by developing solutions that are configured in accordance with the embodiments of the present disclosure, many examples of which are described in detail herein.

BRIEF SUMMARY

In an embodiment, an apparatus comprises one or more processors and one or more storage devices storing instructions that are operable, when executed by the one or more processors, to cause the one or more processors to receive an application programming interface (API) object via a communication channel. In one or more embodiments, the API object defines a feature dataset associated with an API request for an application framework. In one or more embodiments, the instructions are additionally or alternatively operable, when executed by the one or more processors, to cause the one or more processors to apply a machine learning model to (i) the API object and (ii) one or more graph embedding structures for a portion of graph data associated with a respective entity identifier to generate one or more predictive inferences related to the API object. In one or more embodiments, the graph data graphically represents relationships between component objects related to the application framework. In one or more embodiments, the one or more graph embedding structures respectively represent an encoded version of one or more of the relationships for the respective entity identifier. In one or more embodiments, the instructions are additionally or alternatively operable, when executed by the one or more processors, to cause the one or more processors to initiate a response action for the API request based at least in part on the one or more predictive inferences.

In another embodiment, a computer-implemented method is provided. In one or more embodiments, the computer-implemented provides for receiving an application programming interface (API) object via a communication channel. In one or more embodiments, the API object defines a feature dataset associated with an API request for an application framework. In one or more embodiments, the computer-implemented additionally or alternatively provides for applying a machine learning model to (i) the API object and (ii) one or more graph embedding structures for a portion of graph data associated with a respective entity identifier to generate one or more predictive inferences related to the API object. In one or more embodiments, the graph data graphically represents relationships between component objects related to the application framework. In one or more embodiments, the one or more graph embedding structures respectively represent an encoded version of one or more of the relationships for the respective entity identifier. In one or more embodiments, the computer-implemented additionally or alternatively provides for initiating a response action for the API request based at least in part on the one or more predictive inferences.

In yet another embodiment, a computer program product is provided. In one or more embodiments, the computer program product is stored on a computer readable medium, comprising instructions that when executed by one or more computers cause the one or more computers to receive an application programming interface (API) object via a communication channel. In one or more embodiments, the API object defines a feature dataset associated with an API request for an application framework. In one or more embodiments, the instructions, when executed by the one or more computers, additionally or alternatively cause the one or more computers to apply a machine learning model to (i) the API object and (ii) one or more graph embedding structures for a portion of graph data associated with a respective entity identifier to generate one or more predictive inferences related to the API object. In one or more embodiments, the graph data graphically represents relationships between component objects related to the application framework. In one or more embodiments, the one or more graph embedding structures respectively represent an encoded version of one or more of the relationships for the respective entity identifier. In one or more embodiments, the instructions, when executed by the one or more computers, additionally or alternatively cause the one or more computers to initiate a response action for the API request based at least in part on the one or more predictive inferences.

Various other embodiments are also described in the following detailed description and in the attached claims.

BRIEF DESCRIPTION OF THE SEVERAL VIEW OF THE DRAWINGS

Having thus described some embodiments in general terms, references will now be made to the accompanying drawings, which are not drawn to scale, and wherein:

FIG. 9B illustrates another example data flow related to a machine learning model in accordance with one or more embodiments of the present disclosure;

FIG. 12 is a flowchart diagram for providing predictive inferences related to a graph representation of data via deep learning in accordance with one or more embodiments of the present disclosure;

Figure 13:
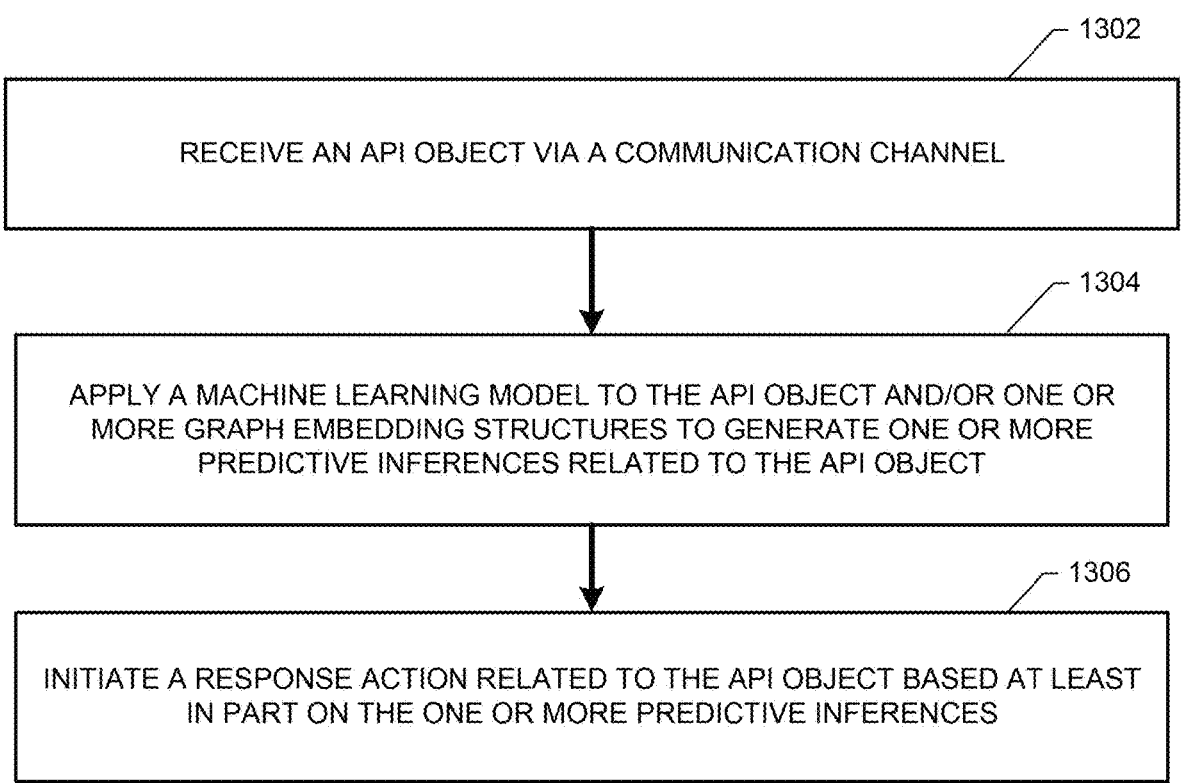

FIG. 13 is a flowchart diagram for providing predictive inferences related to a graph representation of data via an application programming interface in accordance with one or more embodiments of the present disclosure; and FIG. 14 is another flowchart diagram for providing predictive inferences related to a graph representation of data via an application programming interface in accordance with one or more embodiments of the present disclosure.

DETAILED DESCRIPTION OF VARIOUS EMBODIMENTS

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present disclosure address technical problems associated with efficiently and reliably managing server systems such as, for example, managing data objects, components and/or communications provided to a server system. The disclosed techniques can be provided by an apparatus integrated with an application framework where multiple components/resources and/or layers of components/resources interact with one another in several complex manners to provide collaborative applications and/or collaborative services. Various embodiments of the present disclosure additionally or alternatively address technical problems associated with machine learning models that process data related to data objects, components and/or communications to provide predictive insights related to a server system.

An application framework (e.g., a cloud application framework) is typically characterized by a large number of the application components (e.g., services, microservices, and the like) that are offered by the application framework. Those application components typically include a large number of frontend application components and/or a large number of backend application components. One example application framework might include an enterprise instance of Jira®, an action tracking and project management software platform, developed by Atlassian Pty. Ltd. that may be licensed to Beta Corporation. Other software platforms may serve as application frameworks (e.g., Confluence®, Trello®, Bamboo®, Clover®, Crucible®, etc. by Atlassian Pty. Ltd) as will be apparent to one of ordinary skill in the art in view of the foregoing discussion.

Due to the scale and the numerosity of the application components, a large number of data objects may be generated by the application framework during a time interval. These created data objects may be generated for a variety of purposes and can be difficult to manage due to the sheer volume data objects and due to the complexity of the application framework. For example, the application framework may be configured as a collaborative application framework and data objects may be generated as a result of events, incidents, changes, component requests, alerts, notifications, workflows, service requests, service tickets, and/or other dynamic data related to the collaborative application framework. The data objects generated by an application framework may also relate to a business or enterprise that has deployed or licensed the application framework for managing events, incidents, changes, component requests, alerts, notifications, workflows, service requests, service tickets, and/or other dynamic data. Additionally, to further add to the complexity of the application framework, data objects may be transmitted via multiple types of communication channels such as, for example, email, application portals, widgets, chat channels, application programming interface (API) calls, etc.

To manage the scale, numerosity, and/or complexity of the data objects, an application framework may store one or more portions of data objects and/or related data as a graphical data structure to graphically represent interconnected data and/or dependencies related to application components. For example, a graphical data structure may include component objects and component object dependencies that are represented by nodes and edges of the graphical data structure. In some examples, a graphical data structure may include one or more weighted graphs, multigraphs, isomorphic graphs, trees, the like, or combinations thereof.

However, it may still be difficult for an application framework utilizing graphical data structures to manage data objects given the complexity and scale of modern application frameworks. It may also be difficult to manage and optimize data requirements and/or computing resources related to application components of such application frameworks. Moreover, it may also be difficult to obtain meaningful information from graphical data structures related to events, incidents, changes, component requests, alerts, notifications, workflows, service requests, service tickets, and/or other dynamic data related to an application framework. For instance, a machine learning model may be unable to utilize data for predictive insights as stored and/or formatted in the graphical data structures. In a non-limiting example, consider a scenario in which it is desirable for Beta Corporation to manage collaborative portions of a service management process such as, for example, an information technology service management process (or another type of application component process) such that service tickets and/or one or more service ticket workflow actions are automatically processed and resolved. However, the services management processes and/or workflows may result in a vast and complex collection of graph data related to graphical data structures, resulting in difficulties for tracing data objects, inefficient usage of computing resources, and/or other technical drawbacks. Additionally, a format of the graph data for the graphical data structures may be unsuitable for input to a machine learning model configured for predictive insights.

To address the above-described challenges related to managing server systems and/or utilizing graph data structures related to server systems, various embodiments of the present disclosure are directed to systems, apparatuses, methods, and/or computer program products for processing multi-domain data to initiate automated actions via a graphical representation layer of an application framework. In various embodiments, the graphical representation layer is utilized to provide predictive inferences related to a graph representation of data via deep learning. The graphical representation layer can be integrated within an application framework. The graphical representation layer can also interact with a deep learning model, a machine learning API system, one or more augmentation or transformation layers, data stores (e.g., graph store layer), machine learning models, and/or other components of an application framework.

In various embodiments, the graphical representation layer can be agnostic of the graphical format of the underlying data, enabling vast and complex collections of graph data related to graphical data structures (that would otherwise be difficult to combine and use for machine learning) to be leveraged for insights via machine learning. The graphical representation layer can be configured to include graph centrality measures, community detection capabilities, link prediction, sub graph isomorphism, etc. The graph embeddings can include temporal properties and exist dependent on a time interval. The temporal properties of the graph embeddings can enable the graphical representation layer to resolve time dependent queries and predict how the graph embeddings may change over time. Further, the temporal properties can allow the graphical representation layer to dynamically represent user collaborations and/or to respond to new data. For example, a relationship between two entities may not exist at one interval in time, but as a result of a new event with respect to an application framework, the relationship may automatically become established at a later interval in time.

The graphical representation layer can be configured to generate graph embeddings (e.g., digital fingerprints, graph embedding structures, etc.) for users based on multiple domains of data (e.g., multiple graph stores). The graph embeddings can be utilized to characterize behavior of users and/or relationships across multiple domains of interactions and services. For example, a graph embedding may be based on data within one or more graph stores descriptive of the historical user interactions such as comments, queries, communications with other users, assignments to or roles in various projects, products, teams etc.

The graph embeddings can represent various insights from multi-domain graph stores in a format (e.g., linearized vector format) easily usable by machine learning models integrated with the graphical representation layer. In various embodiments, a machine learning API system may apply one or more machine learning models based on the graph embeddings to initiate an action in response to an event.

The graphical representation layer can be configured to dynamically represent data spanning multiple domains (e.g., data stores) and generate graph embeddings used to infer actions in response to events, incidents, changes, component requests, alerts, notifications, workflows, service requests, service tickets, and/or other dynamic data related to an application framework. For example, a graphical representation layer may be configured to help resolve queries such as "who are the most reliable people to connect to for solving this incident", "who is the ideal person to approve this change request", "which articles will be most relevant for this help portal user", etc. In one or more embodiments, the graphical representation layer can be communicatively coupled to and/or integrated with a virtual agent, an incident management system, a suggestion system, a portal customization system, a customer support system, a cross-flow system, etc. Additionally, the graphical representation layer can be used for applications such as fault localization, inferring a subject matter expert in a domain, inferring team or project membership, finding recurring incident patterns, predicting outages, targeting in electronic communications, etc.

In various embodiments, the application framework integrated with the graphical representation apparatus can include components (e.g., services, microservices, and the like). Components of the application framework may include, for example, components related to one or more layers of the application framework. In one or more embodiments, the application framework may facilitate remote collaboration between components. In one or more embodiments, the graphical representation layer employs a database associated with graphical data structures to convert graph data associated with the graphical data structures into a graph embedding structure to be utilized for one or more machine learning models of a machine learning API system. In one or more embodiments, the graphical representation apparatus is integrated with a graphical representation layer of the application framework to apply a deep learning model to the graph data and generate respective graph embedding structures. In some embodiments, an API can be provided to interact with one or more machine learning models that utilize the respective graph embedding structures. For instance, in some embodiments, an API-driven user interface can be provided to enable interaction with the graphical representation layer. In one or more embodiments, the user interface provides a visualization related to actions managed by the graphical representation layer.

In some embodiments, a first machine learning engine can be configured to apply a deep learning model to graph data of a graphical data structure to generate a graph embedding structure for a portion of the graph data associated with a particular user identifier. The graphical data structure can graphically represent collaboration relationships between component objects related to a multi-component system of an application framework. The graph embedding structure can represent an encoded version of the collaboration relationships for the user identifier. Additionally, a second machine learning engine can be configured to apply at least one machine learning model to the graph embedding structure to generate one or more predictive inferences related to the graphical data structure. In some examples, an API layer of the application framework can be configured to execute the at least one machine learning model to generate the one or more predictive inferences.

By employing the graphical representation layer to manage workflows related to an application framework, computing resources and/or memory allocation with respect to processing and storage of graph data for the application framework can be improved. In doing so, various embodiments of the present disclosure make substantial technical contributions to improving the efficiency and/or the effectiveness of an application framework. Various embodiments of the present disclosure additionally or alternatively provide improved representation, management, and application of multi-domain graph data, improved cross-product collaboration, improved searchability, improved service request support, improved usability, improved data quality, improved interactions, improved processes, improved workflows, improved incident prediction, improved remote collaborations with respect to data related to an application framework. Moreover, various embodiments of the present disclosure additionally or alternatively provide improved graphical representation model performance and/or formatting of data for improved machine learning model related to a graphical representation of data. For example, by applying a deep learning model to graphical data structures, a graph embedding structure capable of being processed by one or more other machine learning models may be realized, thereby improving performance and capabilities of the one or more machine learning models for a diverse number of applications. In addition, parameters, weights, and/or other configurations for a machine learning model may be optimally tuned via multiple training stages based on feedback data related to predictive insights.

Definitions

As used herein, the terms "data," "content," "digital content," "information," and similar terms may be used interchangeably to refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "client device," "computing device," "network device," "computer," "user equipment," and similar terms may be used interchangeably to refer to a computer comprising at least one processor and at least one memory. In some embodiments, the client device may further comprise one or more of: a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client device" may refer to computer hardware and/or software that is configured to access a component made available by a server. The server is often, but not always, on another computer system, in which case the client accesses the component by way of a network. Embodiments of client devices may include, without limitation, smartphones, tablet computers, laptop computers, personal computers, desktop computers, enterprise computers, and the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "server computing device" refers to a combination of computer hardware and/or software that is configured to provide a component to a client device. An example of a server computing device is the application framework system 105 of FIG. 1. Another example of a server computing device is, in certain embodiments, the graphical representation apparatus 120 of FIG. 1. In some embodiments, a server computing device communicates with one or more client computing devices using one or more computer networks.

The term "circuitry" may refer to: hardware-only circuit implementations (e.g., implementations in analog circuitry and/or digital circuitry); combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of "circuitry" applies to all uses of this term herein, including in any claims. Additionally, the term "circuitry" may refer to purpose-built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

The term "application framework" refers to a computing environment associated with one or more computing devices and one or more components (e.g., one or more application components), where the environment enables interactions with respect to components supporting at least one application. For example, an application framework can be a system (e.g., a server system, a cloud-based system, an enterprise system, etc.) where multiple components, multiple resources associated with components, multiple layers of components, and/or multiple layers of resources interact with one another in several complex manners. In some embodiments, the components are associated directly or indirectly with an application supported by the components. In some embodiments, the components can support the application over one or more communication networks. The application framework can include one or more components to generate and update a repository of collected information for each component (e.g., an event object repository). Accordingly, the application framework can provide for the collection of information, in the form of event objects, to facilitate monitoring of event streams associated with one or more components of the application framework. In certain embodiments, the application framework can be configured as a collaborative application framework that manages one or more collaborative applications such as, for example, one or more collaborative document applications, collaborative software development applications, and/or one or more other types of collaborative applications. In certain embodiments, the application framework can be configured as an enterprise instance of a collaboration and knowledge base component platform for managing documents and/or encouraging collaboration among users. In certain embodiments, the application framework can be configured as a service management software platform. In certain embodiments, the application framework can alternatively be configured to manage one or more project management applications, one or more work management applications, one or more software development applications, one or more product development applications, one or more portfolio management applications, or one or more other types of applications. In certain embodiments, the application framework can be configured as an enterprise instance of an information technology service management software platform. However, it is to be appreciated that, in other embodiments, the application framework can be configured as another type of component platform.

The term "application framework system" refers to a system that includes both a server framework and a repository to support the server framework. For example, an application framework refers to a system that includes a computing environment associated with one or more computing devices and one or more components, as well as a repository of collected information for each component and/or each computing device. In certain embodiments, the repository is a graph store that stores one or more graphical data structures to support the server framework. In certain embodiments, an application framework system additionally includes a machine learning API system to further support the server framework. The machine learning API system can utilize one or more machine learning models to support the server framework.

The term "application," "app," or similar terms refer to a computer program or group of computer programs designed for use by and interaction with one or more networked or remote computing devices. In some embodiments, an application refers to a mobile application, a desktop application, a command line interface (CLI) tool, or another type of application. Examples of an application comprise workflow engines, component desk incident management, team collaboration suites, cloud components, word processors, spreadsheets, accounting applications, web browsers, email clients, media players, file viewers, videogames, and photo/video editors. An application can be supported by one or more components either via direct communication with the component or indirectly by relying on a component that is in turn supported by one or more other components.

The term "component" or "component application" refers to a computer functionality or a set of computer functionalities, such as the retrieval of specified information or the execution of a set of operations, with a purpose that different clients can reuse for their respective purposes, together with the policies that should control its usage, for example, based on the identity of the client (e.g., an application, another component, etc.) requesting the component. Additionally, a component may support, or be supported by, at least one other component via a component dependency relationship. For example, a translation application stored on a smartphone may call a translation dictionary component at a server in order to translate a particular word or phrase between two languages. In such an example the translation application is dependent on the translation dictionary component to perform the translation task.

In some embodiments, a component is offered by one computing device over a network to one or more other computing devices. Additionally, the component may be stored, offered, and utilized by a single computing device to local applications stored thereon and in such embodiments a network would not be required. In some embodiments, components may be accessed by other components via a plurality of APIs, for example, JavaScript Object Notation (JSON), Extensible Markup Language (XML), Simple Object Access Protocol (SOAP), Hypertext Markup Language (HTML), the like, or combinations thereof. In some embodiments, components may be configured to capture or utilize database information and asynchronous communications via message queues (e.g., Event Bus). Non-limiting examples of components include an open source API definition format, an internal developer tool, web based HTTP components, databased components, and asynchronous message queues which facilitate component-to-component communications.

In some embodiments, a component can represent an operation with a specified outcome and can further be a self-contained computer program. In some embodiments, a component from the perspective of the client (e.g., another component, application, etc.) can be a black box (e.g., meaning that the client need not be aware of the component's inner workings). In some embodiments, a component may be associated with a type of feature, an executable code, two or more interconnected components, and/or another type of component associated with an application framework.

In some embodiments, a component may correspond to a service. Additionally or alternatively, in some embodiments, a component may correspond to a library (e.g., a library of components, a library of services, etc.). Additionally or alternatively, in some embodiments, a component may correspond to one or more modules. Additionally or alternatively, in some embodiments, a component may correspond to one or more machine learning models. For example, in some embodiments, a component may correspond to a service associated with a type of service, a service associated with a type of library, a service associated with a type of feature, a service associated with an executable code, two or more interconnected services, and/or another type of service associated with an application framework.

The term "service" refers to a type of component. In some embodiments, a service provides a visual representation of one or more data structures. In some embodiments, a service is configured for viewing data, searching for data, creating data, updating data, managing relationships among data, assigning attributes related to data, and/or storing data associated with one or more data structures. In some embodiments, a service is configured as a system, tool or product to facilitate viewing data, searching for data, creating data, updating data, managing relationships among data, assigning attributes related to data, and/or storing data associated with one or more data structures. In some embodiments, a service comprises a set of metadata attributes associated with a technical capability, a technical configuration, an application capability, an application configuration, and/or another metadata attribute. In some embodiments, a service is published to one or more client devices via one or more APIs. In some embodiments, a service is a logical representation of an application stack. In some embodiments, a service corresponds to one or more microservices.

The term "microservices" refers to a set of services that are interconnected and independently configured to provide a monolith service. In some embodiments, a microservice is configured with one or more APIs integrated with one or more other microservices and/or one or more other applications. In some embodiments, a microservice is a single-function module with a defined set of interfaces and/or a defined set of operations configured to integrate with one or more other microservices and/or one or more other applications to provide a monolith service.

The term "library" refers to a collection of objects (e.g., a collection of component objects, a collection of service objects, etc.), a collection of functions, and/or a collection of processing threads associated with one or more components.

The term "event" refers to one or more actions, interactions with, and/or one or more changes related to an application framework and/or one or more components. For example, an event can be triggered by one or more actions, interactions with, and/or one or more changes related to an application framework and/or one or more components. In one or more embodiments, an event refers to one or more incidents, changes, component requests, alerts, notifications, workflows, service requests, service tickets, and/or other dynamic data related to an application framework. In some embodiments, an event may be associated with metadata, a unique identifier, one or more attributes, one or more tags, one or more classifications, one or more source identifiers, one or more object types, software data, and/or other context data. In some embodiments, an event may be related to and/or triggered via one or more actions, interactions with, and/or one or more changes related to an electronic document. In some embodiments, an event may be related to and/or triggered via one or more client devices that interact with one or more components. For example, in some embodiments, an event can be related to one or more actions and/or one or more changes initiated via a display screen of a client device. In some embodiments, an event may be related to managing collaborative portions of a service management process such as, for example, an information technology service management process (or another type of application component process) such that service tickets and/or one or more service ticket workflow actions are automatically processed and resolved. Additionally or alternatively, in some embodiments, an event may be triggered via one or more components and/or one or more user identifiers. In some embodiments, an event may be associated with an event stream. For example, an event stream can correspond to aggregated events where an event is related to and/or aggregated with one or more other events.

The term "event stream" refers to a collection of events related to one or more components and/or one or more user identifiers. For example, an event stream can include a first event associated with at least one component, a second event associated with the at least one component, a third event associated with the at least one component, etc. In certain embodiments, an event stream refers to a collection of events related to a collaborative document, collaborative software development, and/or another type of collaborative application.

The term "user identifier" refers to one or more items of data by which a particular user of the application framework may be uniquely identified. For example, a user identifier can correspond to a particular set of bits or a particular sequence of data that uniquely identifies a user. In various embodiments, a user identifier corresponds to a user that is authorized to view, edit and/or work simultaneously on a collaborative document, collaborative software development, and/or another type of collaborative application along with one or more other user identifiers. In some embodiments, a user identifier corresponds to a user related to particular subset of data and/or components of an application framework.

The terms "internal component," "internal resource," or similar terms refer to a program, application, platform, or component that is configured by a developer to provide functionality to another one or more of their programs, applications, platforms, or components, either directly or indirectly through one or more other components, as opposed to using an external component. Internal components operate on a compiled code base or repository that is at least partially shared by an application which utilizes the functionality provided by the internal component. In some embodiments, the application code base and the internal component code base are hosted on the same computing device or across an intranet of computing devices. An application communicates with internal components within a shared architectural programming layer without external network or firewall separation. In some embodiments, an internal component is used only within the application layer which utilizes the internal components functionality. Information related to internal components can be collected and compiled into component objects which can also be referred to as internal component objects. An example embodiment of an internal component is a load balancer configured for routing and mapping API and/or component locations. Internal components may be configured for information-based shard routing, or in other words, routing and mapping API and/or component locations based on predefined custom component requirements associated with an application. For example, an internal component may be configured to identify where communication traffic originates from and then reply to the communications utilizing another component for reply communication.

The terms "external component," "external resource," "remote resource," or similar terms refer to a program, application, platform, or component that is configured to communicate with another program, application, platform, or component via a network architecture. In some embodiments, communications between an external component and an application calling the external component takes place through a firewall and/or other network security features. The external component operates on a compiled code base or repository that is separate and distinct from that which supports the application calling the external component. The external components of some embodiments generate data or otherwise provide usable functionality to an application calling the external component. In other embodiments, the application calling the external component passes data to the external component. In some embodiments, the external component may communicate with an application calling the external component, and vice versa, through one or more APIs. For example, the application calling the external component may subscribe to an API of the external component that is configured to transmit data. In some embodiments, the external component receives tokens or other authentication credentials that are used to facilitate secure communication between the external component and an application calling the external component in view of the applications network security features or protocols (e.g., network firewall protocols). An example embodiment of an external component may include cloud components (e.g., AWS®).

The term "interaction signal" refers to a signal received by one or more computing devices (e.g., servers, systems, platforms, etc.) which are configured to cause an application framework system to perform one or more actions associated with one or more components of the application framework system. The interaction signal may be received via a component management interface, an API, a communication interface, the like, or combinations thereof. In one or more embodiments, the interaction signal may be generated by a client device via one or more computer program instructions. In various embodiments, an interaction signal can be generated via a collaborative application, event, event stream, or the like. Additionally or alternatively, the interaction signal may cause one or more actions, one or more changes, and/or one or more predictive inferences with respect to a collaborative application, event, event stream, or the like.

The term "interface element" refers to a rendering of a visualization and/or human interpretation of data associated with an application framework and/or a distributed ledger system. In one or more embodiments, an interface element may additionally or alternatively be formatted for transmission via one or more networks. In one or more embodiments, an interface element may include one or more graphical elements and/or one or more textual elements.

The term "visualization" refers to visual representation of data to facilitate human interpretation of the data. In some embodiments, visualization of data includes graphic representation and/or textual representation of data.

The term "graphical control element" refers to a computer input element that allows a user to enter input to facilitate one or more actions with respect to an application framework.

The term "interface area" refers to an area of an electronic interface, where the area may be situated in relation to one or more other interface areas of the electronic interface. An interface area may be comprised of groupings of pixels, or may be defined according to coordinates of a display device configured to render the interface. A size of an interface may be adjusted according to parameters associated with the display device. An interface area may include one or more interface elements. For example, an interface element may include a visualization. In certain embodiments, an interface area may include one or more graphical elements and/or or more textual elements. In certain embodiments, an interface area may be void of an interface element and/or a visualization. In certain embodiments, an interface area may include a graphical control element and/or one or more other interactive interface elements.

The term "graphical data structure" refers to a data entity that graphically represents interconnected graph data and/or dependency relations of graph data or application components. In some embodiments, a graphical data structure may include component objects and component object dependencies that are represented by nodes and edges of the graphical data structure. In some embodiments, graphical data structure may include one or more weighted graphs, multigraphs, isomorphic graphs, trees, and or the like or combinations thereof. In some embodiments, a graphical data structure may be based on data within one or more graph stores descriptive of historical user interactions. Graphical data structures may be related to events and/or other dynamic data related to an application framework. Graphical data structures may be used to characterize behaviors of users and or relationships across multiple domains of interactions and services. For example, a graphical data structure may be used to generate a graph feature set that includes one or more features associated with the graph data of the graphical data structure. A graphical data structure may store one or more portions of data objects and/or related data. For example, a graphical data structure may be used by an application framework to store one or more portions of data objects and/or related data.

The term "graph feature set" refers to a transformation of a graphical data structure that represents one or more features of the graphical data structure. For example, a graph feature set associated with a graphical data structure including graph data and component objects may include one or more features associated with the graph data and component objects. A graph feature set may be formatted such that the graph feature set is usable by a machine learning model. For example, a graph feature set in the format of a linearized vector may be input to a deep learning model to generate a graph embedding structure.

The term "graph embedding structure" refers to a data entity that encodes graphical data into a defined vector representation (e.g., a low-dimensional vector representation) for one or more machine learning models. For example, a graph embedding structure may include embeddings representative of nodes and edges of a graphical data structure. In some embodiments, the embeddings of a graph embedding structure are based on, for example, feature information present in a given neighboring nodes and/or may be dynamically updated as the features and/or neighbors change. In some embodiments, a graph embedding structure is generated by a deep learning model which receives a graph feature set as input. In some embodiments, a graph embedding structure is a representation of collaboration relationships between component objects related to a multi-component system of an application framework. In one or more embodiments, a graph embedding structure is associated with a particular one or more user identifiers. For example, a graph embedding structure may be a multi-dimensional vector representative of a plurality collaborations between two users, where the number of instances of collaboration, the types of collaborations, and temporal data of the collaborations are represented. In some embodiments, graph embedding structures may be representative of relationships between users such as approvers, incident responders, customer agents, or the like. Additionally or alternatively, graph embedding structures may be representative of relationships between entities such as incidents, alerts, support tickets, or the like. In various embodiments, graph embedding structures encode underlying graphical structures into a common representation to infer non-trivial insights. In some embodiments, graph embedding structures are a projection of a graphical structure on a lower dimensional latent space which can then be used for machine learning based comparisons, insights, and/or other machine learning techniques. In some embodiments, each of the weights of the graph embedding structure can be computed using deep learning. In some embodiments, each of the weights of the graph embedding structure can be determined using heuristics.

Various embodiments of the present disclosure relate to providing predictive inferences in response to incidents such as, for example, which articles or news a user will be interested in when opening a help center portal, or to whom a customer support ticket should be assigned, or finding which users are the most reliable users to connect to for triaging an incident, or the like. In such examples, when applying graphical data structures, there may be multiple answers to each incident reachable through various paths, and there may be multiple users, entities, and components involved. In some embodiments, graph embedding structures can be used to disambiguate users and entities and enrich data quality and relationships. In some embodiments, a graph embedding structure characterizes each user's behavior including the user's comments, queries, interactions, associations, or the like. The graph embedding structures encapsulate this high dimensional information in a format that enables machine learning models to make comparisons and analyses.

In some embodiments, the graph embedding structure can be a vector representation of graphical relationships which enables comparisons of varying degrees of influence in a collaboration simultaneously with the temporal nature of the collaboration relationship. The graph embedding structure can enable the comparison of two nodes or subgraphs, for example, using vector similarity. Graph embeddings preserve the properties of the graph while maintaining scalability and optimal dimensionality for manageable comparisons. For example, graph embedding structures can be compared to find a most similar pair of graph embedding structures from a plurality of candidate graph embedding structures. For example, one or more vector distances can be computed using cosine distance, Minkowski distance, or the like.

The term, "predictive inference" refers to refers to a data construct that describes one or more predictions inferred by one or more machine learning models. A predictive inference can include one or more insights, classifications, and/or inferences related to one or more graphical data structures and/or one or more graph embedding structures. In some embodiments, a predictive inference refers to a data entity that is configured to describe a real-world prediction about a potential resolution or action in response to an incident. For example, a predictive inference can be a prediction made based on at least a graph embedding structure by a machine learning model in response to an incident. In some embodiments, a predictive inference is the output of one or more machine learning models where the one or more machine learning models receive at least a graph embedding structure to generate the predictive inference. In some embodiments, a predictive inference is a resolution to a query that relates to at least an incident. In some embodiments, a predictive inference is a resolution to a query that related to at least an incident and/or a user and/or one or more components of an application framework system.

In one example, a predictive inference may be directed to suggesting a subject matter expert for an incident such as a customer support request or service request associated with a user. In such an example, generating a predictive inference may include using a scoring function which takes into account distances between a graph embedding structure associated with the incident and a graph embedding structure associated with the user. In various embodiments, a predictive inference may be used to resolve queries such as, which service an incident belongs to based on alerts from multiple services, which recent deployment was responsible for an incident, which user in an organization would be interested in a particular product, or the like. In some embodiments, a predictive inference may initiate one or more actions with respect to a virtual agent, a graphical user interface, a client device, and/or another entity.

The term "machine learning model" refers to a data entity that describes parameters, hyper-parameters, and/or defined operations of a machine learning model (e.g., model including at least one of one or more rule-based layers, one or more layers that depend on trained parameters, coefficients, and/or the like). A machine learning model may include any type of model configured, trained, and/or the like to generate an output for a predictive and/or classification task in any predictive domain. A machine learning model may include one or more of any type of machine learning model including one or more supervised, unsupervised, semi-supervised, reinforcement learning models, and/or the like. For instance, a machine learning model may include a supervised model that may be trained using a historical training dataset. In some examples, a machine learning model may include multiple models configured to perform one or more different stages of a classification and/or prediction process.

In some embodiments, a machine learning model is designed and/or trained for a particular predictive domain associated with an application framework. In various embodiments, a machine learning model is designed and/or trained to apply one or more machine learning techniques to a graph embedding structure to generate one or more predictive inferences related to one or more graphical data structures. A machine learning model, for example, may be trained, using a historical training dataset, to generate a classification and/or prediction for an input data object based one or more features of the input data object. In some examples, the performance of a machine learning model may be based on a similarity between an input data object and a historical training dataset.

The term "deep learning model" refers to a data entity that describes parameters and/or hyper-parameters and/or defined operations of a deep machine learning model (e.g., model including at least one of one or more rule-based layers, one or more layers that depend on trained parameters, coefficients, and/or the like). In some embodiments, the deep machine learning model is configured to process a graph feature set in order to generate a graph embedding structure related to one or more portions of one or more graphical data structures. In some embodiments, the deep learning model may be a graph neural network.

The term "graph neural network" refers to a data entity that describes parameters and/or hyper-parameters and/or defined operations of a machine learning model (e.g., model including at least one of one or more rule-based layers, one or more layers that depend on trained parameters, coefficients, and/or the like) configured to process graph data related to one or more graphical data structures. In some embodiments, the graph neural network is configured to process a graph feature set in order to generate a graph embedding structure.

The term "linearized vector data structure" refers to a graph embedding structure in a linearized vector format. In a non-limiting contextual example, a simple example vector representation of a graph embedding structure may take the form $V=[w1, w2, w3, w4, \ldots wn]$, where wi refers to the number of times a particular user collaborated with user i in an application framework. The collaboration can be of various types dependent upon, for example, the corresponding components of the application framework. For example, the vector representation of the graph embedding structure can be expanded to take the form $V'=[w1,c1]$, $[w1,c2]$, . . . , $[w1, ck]$, $[w2, c1]$, $[w2, c2]$, . . . , $[w2,ck]$ . . . , . . . , $[wn,c1]$, $[wn,c2]$, . . . , $[wn,ck]]$, where ci refers to the type of collaboration between the particular user and user i. Additionally, a temporal dimension may be added to expand the vector representation of the graph embedding structure to take the form $V''=[w1,c1,t1]$, . . . $[w1,c1, tm]]$, $[w1,c2,t2]$, . . . $[w1, c2,tm]$ . . . , . . . , $[[w1,ck, t1]$, . . . $[w1,ck,tm]$, . . . $]$, where ti refers to the time of the collaboration between the particular user and user i.

The term "adjacency list structure" refers to a data entity that represents a graphical data structure as an array of linked lists. In some embodiments, the adjacency list structure is an array of lists that store adjacent nodes of a graphical data structure. In some embodiments, an adjacency list structure is a more space efficient representation of a graph than, for example, an adjacency matrix.

The term "feedback data" refers to data collected from users that reflects one or more aspects of a user experience via a client device and/or a graphical user interface. In some embodiments, feedback data may include data representative of explicit feedback (e.g., feedback text received or requested from a user) or implicit feedback (e.g., user behavior such as complying or not complying with a suggestion). For example, feedback data may include data representative of a result chosen by a user (e.g., the selection of a subject matter expert (SME) from a list of suggested SMEs), data representative of the rank of a result chosen by a user (e.g., an SME chosen by the user was the third highest ranked SME suggested), data representative of an opinion of a user (a user written or spoken response to a prompted query intended for obtaining feedback), and/or the like.

In some embodiments, feedback data is used to update various components of the systems described herein. In some embodiments, feedback data is received via a client device. In some embodiments, feedback data may be used to update or modify graphical data structures, machine learning models, graph embedding structures, correct spurious information, tune weights of a model, remove edges of a graphical data structure, update a predictive inference, or the like. In some embodiments, the use of feedback data to update and/or modify the systems described herein allow such systems to continuously learn and dynamically stay up to date with new information and improve performance. For example, a positive training result may be used to tune a machine learning model (e.g., fine tune a loss function which maps input features to the model output) where the positive training result is based on feedback data representative of an instance in which a user chooses a suggested result. In another example, a negative training result may be used to tune a machine learning model where the negative training result is based on feedback data representative of an instance in which a user does not choose any one of a recommended set of results. In yet another example, feedback data may be used to perform various operations of reinforcement learning with human feedback.

The term "communication channel" refers to a wired or wireless transmission medium for transmitting data between a client device and an application framework system. To communicatively couple a client device and an application framework system, a communication channel can be integrated with a component management interface, an API, a communication interface. In an example, the communication channel can be a network communication channel that communicatively couples a client device and an application framework. A communication channel can be related to a portal, chat, email, web, widget, API call, text, notification, telephone, video, and/or other type of communication. In various embodiments, a communication channel can be configured for transmitting messages and/or signals such as, for example, service messages or service signals, between a client device and an application framework.

The term "API object" refers to a data structure that represents at least a portion of an API request and/or an API call related to a machine learning request for the application framework system. The API object can take the structural form of a vector or other appropriate data structure for representing an API request and/or an API call. Additionally, an API object can be received by one or more computing devices (e.g., servers, systems, platforms, etc.) which are configured to cause an application framework system to perform one or more actions associated with one or more machine learning models of the application framework system.

The API object may be generated by an application or received by an application framework system via a communication channel or the like. In one or more embodiments, the API object may be generated by a processor of the application framework system via one or more computer program instructions. Alternatively, in one or more embodiments, the API object may be generated by a client device via one or more computer program instructions. In various embodiments, an API object can be generated via a service ticket, a service message, a service request, a service conversation, an API call, an application portal, a chat message conversation, an email exchange, a web interface, a widget interface, a workflow, a collaborative dashboard, a service management application, a project management application, a work management application, a software development application, a product development application, a portfolio management application, a collaborative application, or another type of process related to an application framework. Additionally or alternatively, an API object may cause one or more machine learning actions, one or more changes, and/or one or more authorizations with respect to a service ticket, a service message, a service request, a service conversation, an API call, an application portal, a chat message conversation, an email exchange, a web interface, a widget interface, a workflow, a collaborative dashboard, a service management application, a project management application, a work management application, a software development application, a product development application, a portfolio management application, a collaborative application, or another type of process related to an application framework. In some embodiments, an API object is a service message object that defines a feature dataset for a service request for an application framework. In some embodiments, an API object is a recommendation system object that defines a feature dataset for a relevancy request related to component objects of an application framework.

The term "service message object" refers to a data structure that represents at least a portion of a service message related to a service request for the application framework system. The service message object can take the structural form of a vector or other appropriate data structure for representing a service message. Additionally, a service message object can be received by one or more computing devices (e.g., servers, systems, platforms, etc.) which are configured to cause an application framework system to perform one or more actions associated with one or more service event workflows and/or one or more components of the application framework system.

The term "recommendation system object" refers to a data structure that represents at least a portion of a recommendation request related to relevancy for the application framework system. The recommendation system object can take the structural form of a vector or other appropriate data structure for representing a recommendation request. Additionally, a recommendation system object can be received by one or more computing devices (e.g., servers, systems, platforms, etc.) which are configured to cause an application framework system to perform one or more actions associated with one or more machine learning models and/or one or more components of the application framework system.

The term "response data object" refers a data structure that represents at least a portion of a response communication generated in response to an API object for the application framework system. The response data object can take the structural form of a vector or other appropriate data structure for representing a response message. Additionally, a response data object can be received by one or more client devices which provided a related API object. In various embodiments, a response data object is a response message object that represents a response message generated in response to a service request for the application framework system. In various embodiments, a response data object is generated by a virtual agent system to obtain additional information related to a related API object. A response data object can include and/or be configured as a message, an alert, a notification, a control signal, an API call, an email message, an application portal communication, a widget communication, a chat channel communication, a web communication, API calls, a set of executable instructions, a workflow, a resolution ticket, visual data, the like, or combinations thereof. In certain embodiments, a response data object can be related to one or more action performed with respect to a client device, a support device, or another type of computing device. In certain embodiments, an action can be performed with respect to a user interface of a client device, a support device, or another type of computing device to render visual data associated with a respective response data object. In certain embodiments, an action can be performed with respect to an application framework system.

The term "feature dataset" refers to one or more features, data items or data elements associated with an API object (e.g., a service message object and/or a recommendation system object) that are collected and represented as part of a feature dataset. The feature dataset may refer to any information associated with an API object and/or a client device associated with an API object, such as, for example, unstructured service message data, metadata, a source identifier, a user identifier, a component identifier, a page or document identifier, one or more object types, feature extraction data, one or more text features, one or more numeric features, binary encoding data, text vectorization data, segmentation data, one or more NLP features, word encodings, term frequency-inverse document frequency (TF-IDF) data, N-gram data, named entity recognition (NER) data, one or more audio features, context data, event data (e.g., incident data), associated computing devices, IP addresses, location information for a client device (e.g., GPS information), access logs, the like, or combinations thereof.

The term "resolution data object" refers to a data structure that represents one or more resolution actions for a service message object. A resolution data object can include and/or be configured as a message, an alert, a notification, a control signal, an API call, an email message, an application portal communication, a widget communication, a chat channel communication, a web communication, API calls, a set of executable instructions, a workflow, a resolution ticket, visual data, the like, or combinations thereof. In certain embodiments, a resolution action can be performed with respect to an application framework system. For example, a resolution action can be associated with one or more workflow events with respect to one or more components of an application framework. In certain embodiments, a resolution action can be associated with one or more workflow events with respect to one or more service management applications, one or more project management applications, one or more work management applications, one or more software development applications, one or more product development applications, one or more portfolio management applications, one or more collaborative applications, or one or more other types of applications managed by an application framework. In certain embodiments, a resolution action can be performed with respect to a client device, a support device, or another type of computing device. In certain embodiments, a resolution action can be performed with respect to a user interface of a client device, a support device, or another type of computing device to render visual data associated with a respective resolution data object.

Thus, use of any such terms, as defined herein, should not be taken to limit the spirit and scope of embodiments of the present disclosure.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, the like or any combination of the aforementioned devices.

Figure 1:
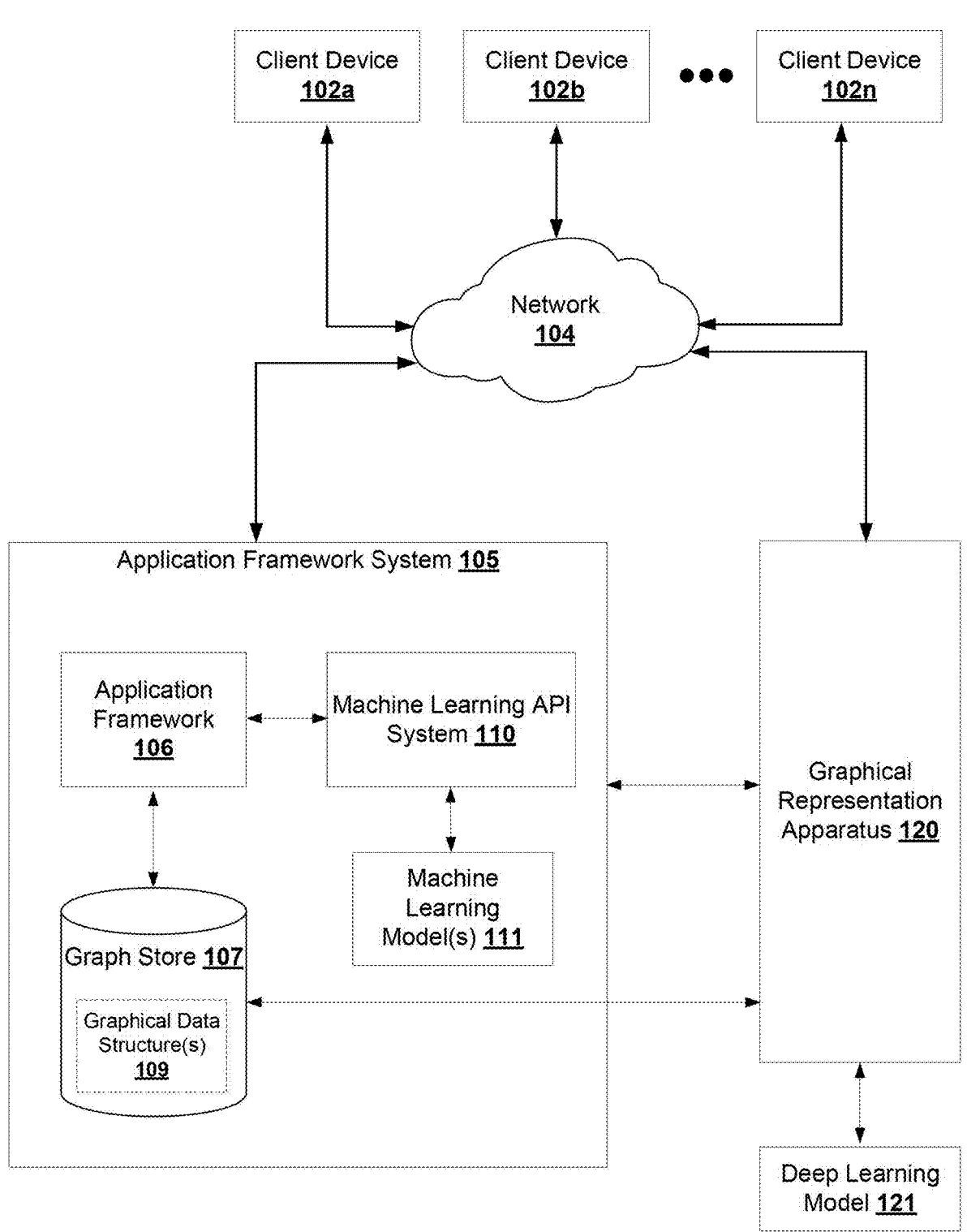
FIG. 1 is a block diagram of an example system within which one or more embodiments of the present disclosure may operate.

FIG. 1 illustrates an example system architecture 100 within which embodiments of the present disclosure may operate. The system architecture 100 includes an application framework system 105 configured to interact with one or more client devices 102a-n, such as client device 102a, client device 102b, and/or client device 102n. In one or more embodiments, the one or more client devices 102a-n may be configured to interact with one or more components managed by an application framework 106 of the application framework system 105. For example, in one or more embodiments, the one or more client devices 102a-n may be configured to send data to the one or more components managed by the application framework 106 and/or receive data from the one or more components managed by the application framework 106. In one or more embodiments, the one or more components may interact with one another in several complex manners to provide collaborative applications and/or collaborative services.

In one or more embodiments, the application framework system 105 includes a graph store 107 associated with one or more graphical data structures 109. The graphical data structures 109 may be associated with data sent to and/or received from the one or more components managed by the application framework 106. For example, the graph store 107 may store graph data for one or more component objects and component object dependencies that are represented by nodes and edges of the graphical data structure 109. The graph store 107 may include one or more storage units, such as multiple distributed storage units that are connected through a computer network. Each storage unit in the graph store 107 may store at least one of one or more data assets and/or one or more data about the computed properties of one or more data assets. Moreover, each storage unit in the graph store 107 may include one or more non-volatile storage or memory media including but not limited to hard disks, ROM, PROM, EPROM, EEPROM, flash memory, MMCs, SD memory cards, memory sticks, CBRAM, PRAM, FeRAM, NVRAM, MRAM, RRAM, SONOS, FJG RAM, Millipede memory, racetrack memory, the like, or combinations thereof.

In some embodiments, the graph store 107 may include one or more graph databases containing graph data associated with one or more component objects and component object dependencies. In some embodiments, the graph data included in graph store 107 is augmented or transformed for compatibility with downstream operations. For example, the graph data of graphical data structures 109 may be transformed into a graph feature set where the graphical data structure graphically represents collaboration relationships between component objects related to a multi-component system of an application framework. The graph feature set may include one or more features associated with the graph data and component objects. In some embodiments, the graph data of graphical data structures 109 may be transformed into adjacency lists or the like. For example, graph data of the graphical data structures 109 may be transformed into an adjacency list structure that represents the graph data as a set of linked lists that respectively represent a particular relationship between nodes of the graph data. In such embodiments, the adjacency list structure may be used to generate a graph feature set.

The system architecture 100 also includes a graphical representation apparatus 120. In an embodiment, the graphical representation apparatus 120 is implemented separate from the application framework system 105. Alternatively, in certain embodiments, the application framework system 105 may include the graphical representation apparatus 120. In various embodiments, the application framework system 105 and/or the graphical representation apparatus 120 may also be configured to interact with the one or more client devices 102*a-n*. In one or more embodiments, the application framework system 105 includes an application framework 106, a machine learning API system 110, one or more machine learning models 111, and/or the graph store 107 configured to store one or more graphical data structures 109. In various embodiments, the graphical representation apparatus 120 may be configured to interact with a deep learning model 121. Alternatively, the graphical representation apparatus 120 may include the deep learning model 121. For example, in one or more embodiments, the graphical representation apparatus 120 may apply a deep learning model 121 to one or more graph feature sets related to the one or more graphical data structures 109 to generate one or more graph embedding structures for a portion of the graph data. In some embodiments, the portion of the graph data may be associated with a user identifier where the graph embedding structure represents an encoded version of the collaboration relationships for the user identifier.

The application framework system 105, the graphical representation apparatus 120, and/or the one or more client devices 102*a-n* may be in communication using a network 104. Additionally or alternatively, in various embodiments, the application framework system 105 and the graphical representation apparatus 120 may be in communication via a backend network and/or an enterprise network separate from the one or more client devices 102*a-n*. The network 104 may include any wired or wireless communication network including, for example, a wired or wireless local area network (LAN), personal area network (PAN), metropolitan area network (MAN), wide area network (WAN), the like, or combinations thereof, as well as any hardware, software and/or firmware required to implement the network 104 (e.g., network routers, etc.). For example, the network 104 may include a cellular telephone, an 802.11, 802.16, 802.20, and/or WiMAX network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. In some embodiments, the protocol is a custom protocol of JSON objects sent via a WebSocket channel. In some embodiments, the protocol is JSON over RPC, JSON over REST/HTTP, the like, or combinations thereof.

A client device from the one or more client devices 102*a-n* may include a mobile device, a smart phone, a tablet computer, a laptop computer, a wearable device, a personal computer, an enterprise computer, a virtual reality device, or another type of computing device. In one or more embodiments, a client device from the one or more client devices 102*a-n* includes geolocation circuitry configured to report a current geolocation of the client device. In some embodiments, the geolocation circuitry of the client device may be configured to communicate with a satellite-based radio-navigation system such as the global position satellite (GPS), similar global navigation satellite systems (GNSS), or combinations thereof, via one or more transmitters, receivers, the like, or combinations thereof. In some embodiments, the geolocation circuitry of the client device may be configured to infer an indoor geolocation and/or a sub-structure geolocation of the client device using signal acquisition and tracking and navigation data decoding, where the signal acquisition and tracking and the navigation data decoding is performed using GPS signals and/or GPS-like signals (e.g., cellular signals, etc.). Other examples of geolocation determination include Wi-Fi triangulation and ultra-wideband radio technology.

In one or more embodiments, the application framework system 105 may be configured to receive one or more interaction signals from one or more of the client devices 102*a-n*. An interaction signal refers to a signal configured to cause one or more actions with respect to the application framework 106. For example, an interaction signal may be a signal configured to cause one or more actions with respect to one or more computing devices and or one or more components managed by the application framework 106. An interaction signal may be generated by the one or more client devices 102*a-n* and may be received via a component management interface of the application framework 106, an API of the application framework 106, a communication interface of the application framework 106, the like, or combinations thereof. Based on the one or more interaction signals, the application framework system 105 may perform one or more actions with respect to the application framework 106. In various embodiments, the one or more actions may be associated with one or more user identifiers associated with one or more events with respect to one or more components of the application framework 106. For example, the one or more actions may initiate and/or correspond to one or more events with respect to one or more components of the application framework 106. In certain embodiments, the one or more actions may be associated with one or more events with respect to a one or more computing devices and or one or more components managed by the application framework 106. In certain embodiments, the one or more actions may be associated with one or more user identifiers with respect to one or more computing devices and or one or more components managed by the application framework 106.

In some embodiments, the graphical representation apparatus 120 may provide a graph embedding structure to the application framework system 105 and/or one or more components of the application framework system 105. In one or more embodiments, the graphical representation apparatus 120 may provide a graph embedding structure to the one or more machine learning models configured to generate one or more predictive inferences related to the graph data. For example, the graphical representation apparatus 120 may provide a graph embedding structure to the one or more machine learning models 111 where the one or more machine learning models 111 are configured to generate one or more predictive inferences related to the graph data. In some embodiments, the graphical representation apparatus 120 may provide the graph embedding structure to the machine learning API system 110 where the machine learning API system 110 is configured to apply the one or more machine learning models 111 to generate one or more predictive inferences related to the graph data.

Figure 2:
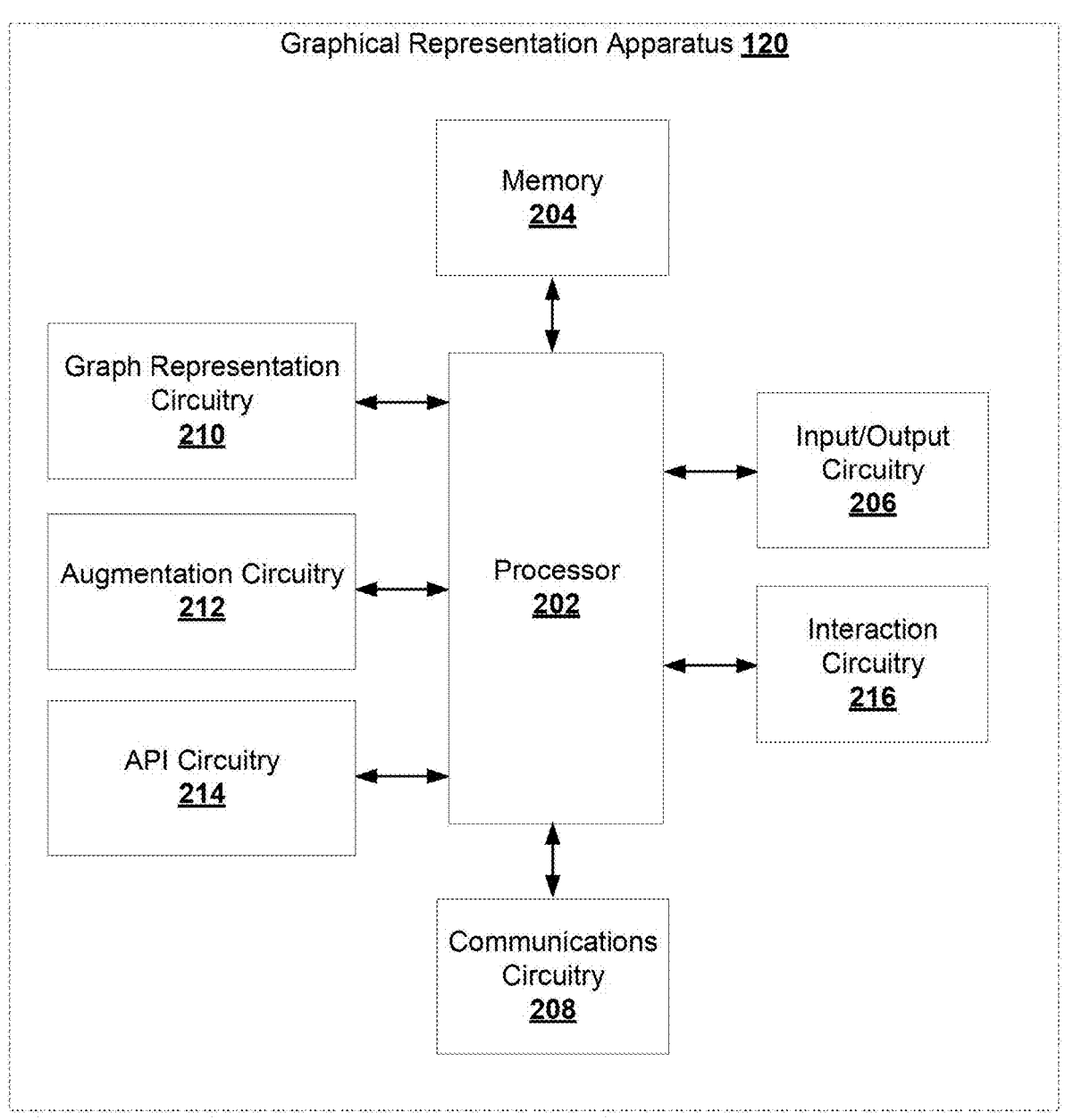
FIG. 2 is a block diagram of an example graphical representation apparatus configured in accordance with one or more embodiments of the present disclosure.

The graphical representation apparatus 120 may be embodied by one or more computing systems, such the graphical representation apparatus 120 illustrated in FIG. 2. In one or more embodiments, the graphical representation apparatus 120 may include processor 202, memory 204, input/output circuitry 206, communications circuitry 208, graph representation circuitry 210, augmentation circuitry 212, API circuitry 214, and/or interaction circuitry 216. The graphical representation apparatus 120 may be configured to execute the operations described herein. Although these components 202-216 are described with respect to functional limitations, it should be understood that the particular implementations necessarily include the use of particular hardware. It should also be understood that certain of these components 202-216 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

In some embodiments, the graphical representation apparatus 120 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the graphical representation apparatus 120. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The graph representation circuitry 210 may be any means such as a device or circuitry embodied in either hardware or a combination of hardware and software that is configured to interact with the graph store 107 and/or the deep learning model 121. In various embodiments, the graph representation circuitry 210 may transform graph data related to the one or more graphical data structures 109 into one or more graph feature sets. Additionally or alternatively, the graph representation circuitry 210 may apply the deep learning model 121 to the one or more graph feature sets to generate one or more graph embedding structures for utilization by the one or more machine learning models 111. In various embodiments, the graph representation circuitry 210 may receive one or more graph feature sets and, in response, generate one or more graph embedding structures which represent one or more nodes and one or more edges of a graph structure in a vectorized representation. For example, the graph representation circuitry 210 may receive transformed graph data, such as a graph feature set from augmentation circuitry 212, and generate a graph embedding structure which embeds the underlying graphical relationships into a low dimensional latent space.

In some embodiments, the graph store 107 may comprise one or more of a single unified repository, a single partitioned repository, or a plurality of isolated repositories comprising one or more partitions. An example embodiment of graph store 107 may comprise separate partitions for isolating information for respective user identifiers associated with a defined portion of the API circuitry. The interaction circuitry 216 may also be configured to generate access logs and/or historical data including information associated with a particular user identifier, computing device, component, component object, the like, or combinations thereof. Historical data may include component activity records for a particular time interval.

In some embodiments, the graph store 107 includes existing graph databases and other stores containing relationship data. For example, the graph store 107 may include one or more collaboration graphs, network graph, triple store graphs, and/or other graphs related to users and/or entities of the application framework 106. In some embodiments, the databases of the graph store 107 are specific to a component of the application framework system 105 and do not contain relationships across multiple components. In some cases, entities stored by the graph store 107 are not normalized. For example, a first graphical data structure may store graph data in a first format and a second graphical data structure may store other graph data in a second format. In such a case, the entities may need to be resolved before cross referencing the graphical data structures. In some embodiments, to resolve this, augmentation circuitry 212 may be used to connect data across graphical data structures and/or other components of the application framework system 105.

The augmentation circuitry 212 may be any means such as a device or circuitry embodied in either hardware or a combination of hardware and software that is configured to transform graph data for improved deep learning via the deep learning model 121. In one or more embodiments, the augmentation circuitry 212 is configured to connect graph data across a plurality of components of the application framework system 105. In some embodiments, the augmentation circuitry 212 may include an entity extractor configured to extract entities from graph data where the entities may be, for example, incidents, changes, deployments, issues, tickets, chat conversations, or the like. In some embodiments, the graph data may be structured or unstructured data and as such, edges of the graph structure may be probabilistic. In a case where the graph data is unstructured, the augmentation circuitry 212 may apply natural language processing to extract one or more entities or concepts which may be a part of the graph data, graphical data structures, feature sets, or the like. For example, one or more entities or concepts extracted from unstructured data may be represented as nodes in a graphical data structure or the like. In another example, the topic or intent of an article may be represented as nodes within a graphical data structure or the like. In some embodiments, one or more entities are extracted from the graph data via natural language processing and used to augment a graph feature set with data associated with the one or more entities to generate an augment graph feature set. In some embodiments, a deep learning model, for example, deep learning model 121, is applied to the augmented graph feature set to generate a graph embedding structure.

In various embodiments, the augmentation circuitry 212 may be configured to interact with the graph store 107 and/or graph data of graphical data structures 109. In one or more embodiments, the augmentation circuitry 212 may transform the graph data of graphical data structures 109. For example, the augmentation circuitry 212 may transform the graph data to generate a graph feature set. In some embodiments, the augmentation circuitry 212 transforms graph data into an input which is understandable by a machine learning model or graph embedding model. For example, the augmentation circuitry 212 may transform graph data such as graphical data structures 109 into an input which is understandable by a graph neural network or graph representation circuitry 210. In some embodiments, the deep learning model, such as deep learning model 121, is a graph neural network model which is applied to a graph feature set to generate a graph embedding structure. In such a case, the augmentation circuitry 212 may be configured to generate the graph feature set from graph data such as the graphical data structures 109.

The API circuitry 214 may be any means such as a device or circuitry embodied in either hardware or a combination of hardware and software that is configured to apply the one or more machine learning models 111 to a graph embedding structure to generate one or more predictive inferences. In various embodiments, the API circuitry 214 may be configured to interact with the application framework 106 and/or the machine learning models 111. For example, the API circuitry 214 may be configured to provide graph embedding structures to the one or more machine learning models 111. Additionally or alternatively, the API circuitry 214 may be configured to initiate execution of the one or more machine learning models 111 based on graph embedding structures. In various embodiments, the API circuitry 214 may interact with the one or more machine learning models 111 to generate one or more predictive inferences related to the one or more graphical data structures 109. The one or more predictive inferences may include investigation inferences, link predictions, isomorphism inferences, centrality analysis, community detection analysis, and/or other machine learning inferences related to graph embedding structures.

The interaction circuitry 216 may be any means such as a device or circuitry embodied in either hardware or a combination of hardware and software that is configured to interact with the application framework system 105 and/or the one or more client devices 102*a-n*. In various embodiments, the interaction circuitry 216 may monitor, analyze, and/or process graph data associated with the application framework system 105 such as, for example, data stored in the graph store 107 and/or data related to a collaborative application. For example, in various embodiments, the interaction circuitry 216 may monitor event streams associated with the application framework 106 to detect respective candidate actions related to components of the application framework 106. In certain embodiments, the interaction circuitry 216 may be configured to retrieve metadata associated with the application framework 106 and/or the graph store 107 to facilitate detection of respective candidate actions related to components of the application framework 106. The metadata may include, for example, data associated with relationships, sources, targets, ownership, consumption, libraries, activities, attributes, incidents, communication channels, dashboards, data repositories, labels, descriptions, and/or other data related to the application framework 106 and/or the graph store 107.

In some embodiments, to facilitate monitoring of event streams, the interaction circuitry 216 may be configured to ping one or more computing devices of the application framework 106, such as via an internet control message protocol, to receive information related to one or more components of the application framework 106. In some embodiments, to obtain event objects associated with the one or more components, the interaction circuitry 216 utilizes the communications circuitry 208 to transmit one or more API calls to one or more API servers associated with the noted client devices.

In some embodiments, one or more external systems (such as a remote cloud computing and/or data storage system) may also be leveraged to provide at least some of the functionality discussed herein.

Figure 3:
FIG. 3 illustrates an example data flow related to a graphical representation apparatus in accordance with one or more embodiments of the present disclosure.

Referring to FIG. 3, an example data flow 300 is presented in accordance with one or more embodiments of the present disclosure. The data flow 300 depicts functionality between the various sub-systems of the system architecture 100, including the graphical representation apparatus 120, the deep learning model 121, and/or the one or more machine learning models 111. In one or more embodiments, the graphical representation apparatus 120 may extract graphical data structure 109 from the graph store 107. In some embodiments, the graphical data structure 109 may graphically represent relationships between component objects related to the application framework 106. For example, the graphical data structure 109 may graphically represent collaboration relationships, component dependency relationships, entity-to-entity relationships, user-to-user relationships, entity-to-user relationships, and/or other relationships between component objects related to the application framework 106. In a non-limiting example, the graphical data structure 109 may include a relationship between a given incident and one or more previously resolved incidents similar to the given incident. In another non-limiting example, the graphical data structure 109 may include a relationship between a given incident and one or more linked alerts. Additionally, the graphical representation apparatus 120 may apply the deep learning model 121 to the graphical data structure 109 to generate a graph embedding structure 302. In some embodiments, the graph embedding structure 302 may represents an encoded version of collaboration relationships for a particular user identifier and/or a particular entity identifier. For example, the graph embedding structure 302 may represents an encoded version of the collaboration relationships for a particular user identifier. As such, the graph embedding structure 302 may be related to a portion of graph data associated with a user identifier and/or may represent an encoded version of the collaboration relationships for the respective user. In some embodiments, the graph embedding structure 302 is a linearized vector data structure that represents the collaboration relationships for the user identifier in a defined format for the one or more machine learning models 111.

In some embodiments, the graphical representation apparatus 120, such as, for example, the augmentation circuitry 212, is configured to transform the graph data of graphical data structure 109 into a graph feature set which may be processed by the one or more machine learning models 111. For example, the graphical representation apparatus 120 may apply the deep learning model 121 to the graph feature set to generate the graph embedding structure 302. In some embodiments, the deep learning model 121 is a neural network model such as, for example, a deep neural network mode, a convolutional neural network model, or another type of neural network model. In some embodiments, the deep learning model 121 is a graph neural network (GNN) model.

In some embodiments, the graphical representation apparatus, such as, for example, API circuitry 214, may apply the one or more machine learning models 111 to the graph embedding structure 302 to generate one or more predictive inferences 304 related to the graphical data structure 109. In some embodiments, the graph embedding structure 302 may be provided to the application framework system 105 where, for example, the machine learning API system 110 applies the one or more machine learning models 111 to the graph embedding structure 302 to generate the one or more predictive inferences 304. In some embodiments, the one or more predictive inferences 304 may initiate one or more alerts, one or more messages, and/or one or more workflows associated with the application framework 106 and/or the one or more client devices 102*a-n*.

Figure 4:
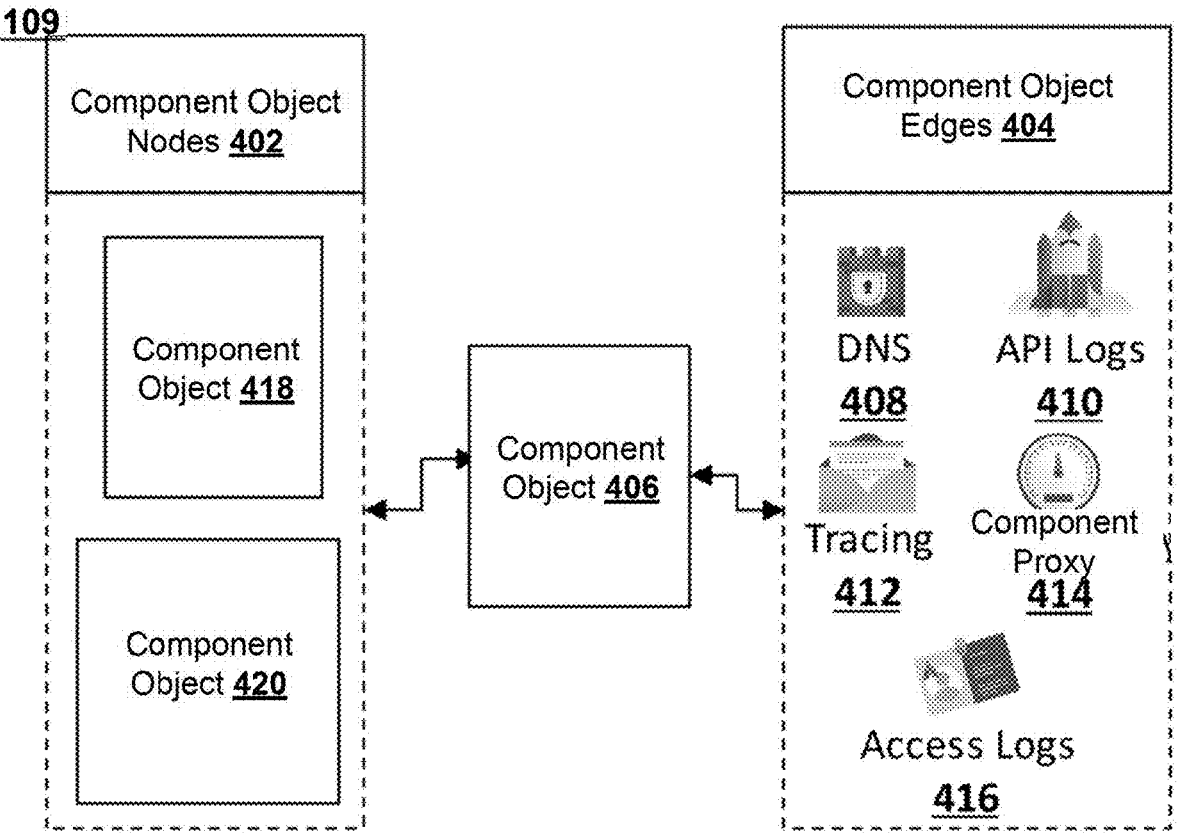
FIG. 4 illustrates example components dependent on other components and data sources in accordance with one or more embodiments of the present disclosure.

Referring now to FIG. 4, an example dependency data structure 400 is presented in accordance with one or more embodiments disclosed herein. In various embodiments, one or more portions of the dependency data structure 400 may be related to and/or included in a graphical data structure 109. For example, the dependency data structure 400 may be a combination of one or more component objects and/or one or more component dependency objects within the graphical data structure 109. In some embodiments, the dependency data structure 400 may refer to a combination of one or more component objects and/or one or more component dependency objects within the graphical data structure 109 that connects a first component object to a second component object. The dependency data structure 400 may also be related to component relationships (e.g., component dependency relationships). For example, terms "component relationship," "component dependency relationship," or similar terms refer to an exchange of data and/or functionality between a first component, or application, and a second component. In some examples, the first component may be directly dependent upon the second component for events, actions, interactions, and/or collaborations with respect to the application framework 106. In some embodiments, the second component may be directly dependent upon a third component whereby the first component is transitively dependent upon the third component via the second component. As such, the component dependency relationship may be a direct relationship comprising two components or it may be a transitive relationship comprising a plurality of components. In some embodiments, a first component and a second component may have a plurality of dependency relationships between them. For example, the second component may perform both a lookup and access log function for the first component.

In an embodiment, the dependency data structure 400 may include a component object 406 that represents a component associated with various component dependency objects. As shown, a component (e.g., a graph store portion) represented by the component object 406 is supported by, and communicably connected via at least a network, with a plurality of other components and data. The plurality of other components and data are represented by component object nodes 402 and component object edges 404 respectively. As such, the connections, between component object 406 and the plurality of component object nodes 402 and component object edges 404, represent one or more of a functional component interface provided to or from the component as represented by component object 406. The component object nodes 402 comprise component object 418 and component object 420, each representing a respective component, which may be configured to receive information signals from and/or transmit information signals to the component associated with component object 406. Component object 418 represents a component that may be called by another component (e.g., the component represented by component object 406) to fetch information about one or more additional components. Component object 420 represents an open source tool to declare APIs.

Moreover, the component associated with component object 406 is further associated with a plurality of component object data as represented by component object edges 404. Each of component object edges 404 may contribute one or more data structures to component object 406. The component object edges 404, as shown, may comprise one or more of domain name system (DNS) lookup 408, API logs 410, tracing 412, component proxy 414, and access logs 416. In various embodiments, the DNS lookup 408, API logs 410, tracing 412, component proxy 414, and/or access logs 416 may be related to events, actions, interactions, and/or collaborations with respect to the application framework 106.

Figure 5:
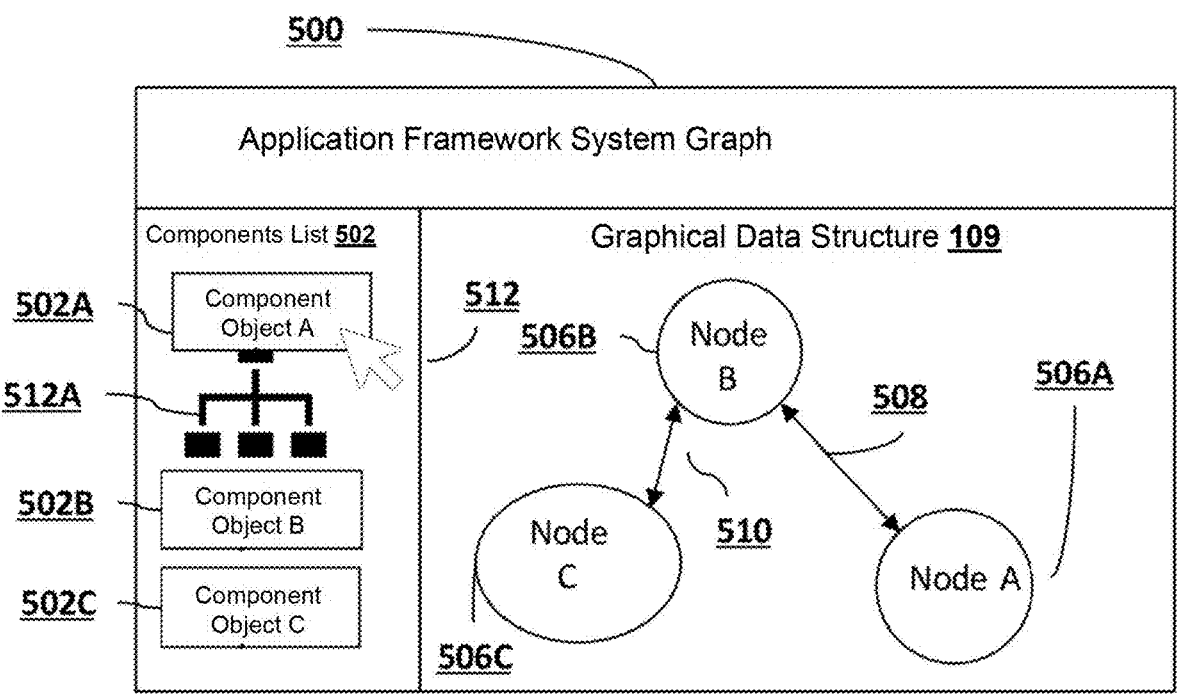
FIG. 5 illustrates an example application framework system graph in accordance with one or more embodiments of the present disclosure.

Referring now to FIG. 5, example application framework system graph 500 is presented which illustrates an operational example of a graphical data structure 109 and a components list 502 in accordance with at least some embodiments of the present disclosure. As shown, components list 502 comprises component objects 502A-C associated with components A-C (not shown) respectively. It should be appreciated that, as shown, component objects 502A-C may be represented by icons configured from the underlying data in application framework system graph 500 such that a user may be presented with additional component object data for components A-C by interacting with one or more of component objects 502A-C. For example, as illustrated, an input signal 512 is received by application framework system graph 500 in relation to component object 502A and, in response, the graph representation circuitry 210 may retrieve additional component object data 512A. The additional component object data 512A from application framework system graph 500 is represented by way of components list 502. According to some embodiments, additional component object data 512A may be configured as a graphical icon, textual information, empirical data, another components list, a pop-up window, a data tree structure, the like, or combinations thereof.

An example embodiment of components list 502 may include components objects 502A-C configured as 'Component-One,' 'Component-Two,' and 'Component-Three' respectively. Each of 'Component-One,' 'Component-Two,' 'Component-Three' may further comprise respective attributes. The attributes comprising an array of name and/or value pairs with properties associated with the underlying component. For example, component object 502A may be identified as 'Component-One' in components list 502, 'Component-One' being the name of the underlying component represented by component object 502A, with additional component object data 512A associated therewith. In such an example, additional component object data 512A may comprise a first attribute such as 'tier=0' to identify 'Component-One' as having a given priority or component level associated with a tier of 0. Additionally, component object 502A associated with 'Component-One' may further comprise a second attribute. For example, component object 502A may identify 'Component-One' as an internal component or an external component via the second attribute, for example, the additional component object data may include the attribute 'author=internal' for 'Component-One.' Moreover, component object 502B may be named 'Component-Two,' after the underlying represented component, and may comprise similar attributes of 'tier=1' and 'author=internal.' The first attribute of 'tier=1' to identify 'Component-Two' as having a given priority or component level associated with a tier of 1 and the second attribute, 'author=internal,' denoting 'Component-Two' as an internal component.

As further shown in FIG. 5, components list 502 may be presented and coordinated with graphical data structure 109. The example graphical data structure 109 as depicted illustrates graphical data structure nodes 506A-C, each representing a respective component A-C (not shown), and associated with component objects 502A-C respectively. The graphical data structure 109 may represent a plurality of component dependencies. For example, graphical data structure node 506A, that represents component A (not shown), is depicted as being dependently connected to graphical data structure node 506B, that represents component B (not shown), by way of graphical data structure edge 508, that represents the dependency relationship between component A and component B. Additionally, graphical data structure node 506B is shown as being dependently connected to graphical data structure node 506C, that represents component C (not shown), by way of graphical data structure edge 510, that represents the dependency relationship between component B and component C. It should be appreciated that data may be transmitted and received bi-directionally by way of the connectivity represented by graphical data structure edges 508 and 510. For example, component B may both send data to and receive data from component C in order to provide functionality to and/or receive functional components from component C. In some embodiments, graphical data structure edges 508 and 510 may represent a plurality of component dependencies between their respective components, represented by graphical data structure nodes 506A-C.

It should be appreciated that as input signals (e.g., input signal 512) are provided to component objects 502A-C the graphical data structure 109 may change in appearance accordingly. It should be appreciated that input signals (e.g., input signal 512) may be provided via an API between applications, a user interface, the like, or combinations thereof. For example, as input signal 512 is received by application framework system graph 500, via component object 502A, and in response component object data 512A is displayed in components list 502 a coordinated response (not shown) may be displayed by graphical data structure 109, such that additional graphical data structure nodes may be represented in the graphical data structure 109. Moreover, the additional graphical data structure nodes may correspond to the components represented by component object data 512A in much the same way, as described herein, that graphical data structure node 506A and component object 502A correspond to each other and underlying component A. In some embodiments, graphical data structure 109 or components list 502 may be modified by application framework system graph 500 without inputs signals received via a user interface.

According to some embodiments, at least portions of components list 502 and the graphical data structure 109 may be combined such that graphical data structure nodes 506A-C are further configured to function in accordance with at least some of the functionality described herein with respect to component objects 502A-C. In such embodiments, components list 502, components thereof, and/or any functionality attributed thereto may be at least partially removed from example application framework system graph 500. It will be further appreciated that any portion of application framework system graph 500 may be configured to receive one or more input signals (e.g., input signal 512) to send/receive data to/from one or more components as described in reference to apparatus 200.

Figure 6:
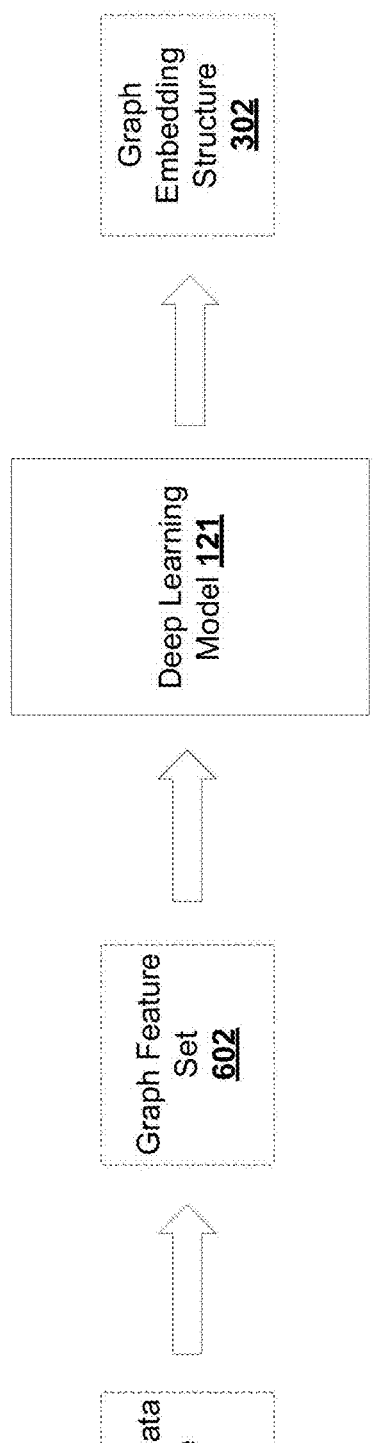
FIG. 6 illustrates an example data flow related to a deep learning model in accordance with one or more embodiments of the present disclosure.

Referring to FIG. 6, an example data flow 600 is presented in accordance with one or more embodiments of the present disclosure. The data flow 600 depicts functionality between the various sub-systems of the system architecture 100, including the graphical representation apparatus 120 and/or the deep learning model 121. In one or more embodiments, the graphical representation apparatus 120 transforms the graphical data structure 109 into a graph feature set 602. The graph feature set 602 may include one or more features associated with graph data of the graphical data structure 109. For example, one or more features of the graph feature set 602 may include, to varying degrees of importance, frequency of collaboration information (e.g., how many times two or more users, entities, or the like have collaborated or interacted with each other), a type of collaboration (e.g., a user created a ticket, a user commented on a ticket, a user resolved an incident, and/or the like), temporality information (e.g., a frequency of interactions between given users, entities, or the like over a given time interval), user generated content (e.g., a text content or features of a user based thereon, such as, for example, a comment on a ticket), and/or the like. Additionally or alternatively, the graph feature set 602 may include one or more features associated component objects of the application framework 106.

In one or more embodiments, the graph feature set 602 may be provided to the deep learning model 121 to generate graph embedding structure 302. For example, the graphical representation apparatus 120 may apply the deep learning model 121 to the graph feature set 602 to generate graph embedding structure 302. In some embodiments, the deep learning model 121 is a neural network model such as, for example, a deep neural network mode, a convolutional neural network model, or another type of neural network model. In some embodiments, the deep learning model 121 is a GNN model. For example, the GNN model may be a graph convolutional network, a graph attention network, or another type of GNN model. In a non-limiting example, an architecture of the GNN model includes one or more portions of a DeepWalk model framework and/or a Graph-SAGE model framework. In various embodiments, the graph embedding structure 302 may be utilized to generate one or more predictive inferences via the one or more machine learning models 111, in accordance with one or more embodiments disclosed herein.

In various embodiments, the deep learning model 121 can be trained to generate graph embedding structures based a training dataset and/or one or more training stages. In one or more embodiments, the deep learning model 121 can be repeatedly trained during multiple training stages until quality criteria for the deep learning model 121 is achieved. In various embodiments, the training dataset for the deep learning model 121 includes data such as, but not limited to, usage data related to components of the application framework 106, collaboration data related to collaborations between users (e.g., shares, likes, comments, and/or a user mention on a digital collaboration page, an author of a digital collaboration page associated with user interactions), digital collaboration data related to content of digital collaboration pages (e.g., a title, section header, and/or extracted key phases related to digital collaboration pages), event data related to one or more events associated with the application framework 106, incident data related to one or more incidents for the application framework 106 (e.g., linked alerts, collaborator information, problem information, root cause information, linked resources, knowledge base articles, and/or other data. In various embodiments, the deep learning model 121 can be trained using masked language modeling with respect to the training dataset. For example, the masked language modeling can predict a representation of masked words given a sentence where one or more words are masked based on a respective user identifier and/or other entity identifier. In certain embodiments, the deep learning model 121 can be trained to predict a link between users of the application framework 106. Additionally or alternatively, the deep learning model 121 can be trained to predict a link between events of the application framework 106. Additionally or alternatively, the deep learning model 121 can be trained to predict a link between an event and a user of the application framework 106.

Figure 7:
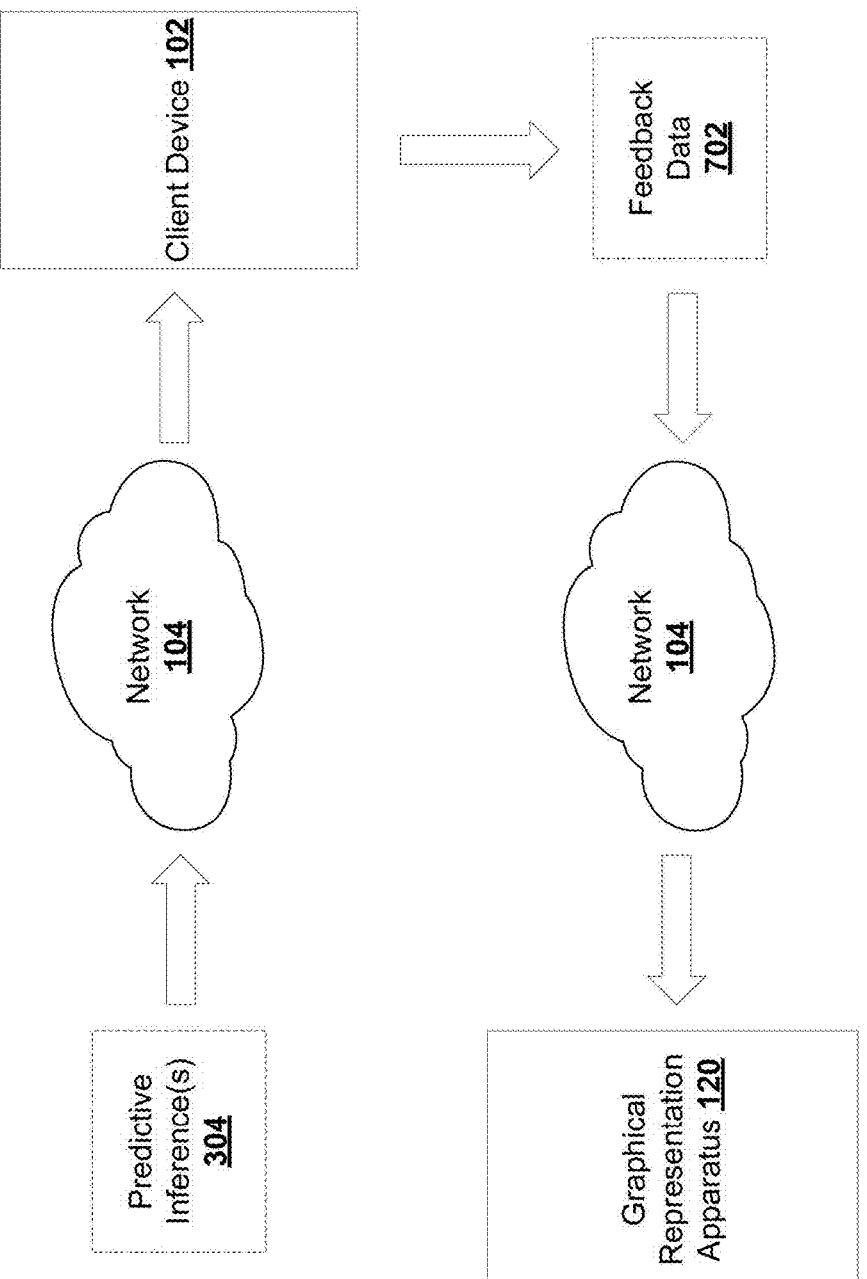
FIG. 7 illustrates an example data flow related to feedback data provided by a client device in accordance with one or more embodiments of the present disclosure.

Referring to FIG. 7, an example data flow 700 is presented in accordance with one or more embodiments of the present disclosure. The data flow 600 depicts functionality between the various sub-systems of the system architecture 100, including the graphical representation apparatus 120 and/or the one or more client devices 102*a-n*.

In one or more embodiments, the graphical representation apparatus 120 may transmit the one or more predictive inferences 304 and/or data associated with the one or more predictive inferences 304 to client device 102 via network 104. In some embodiments, after the client device 102 receives the one or more predictive inferences 304, a user identifier associated with the client device 102 may provide feedback data 702 through network 104 in response to the one or more predictive inferences 304. For example, the client device 102 may provide feedback data 702 to the graphical representation apparatus 120 in response to one or more user iterations with respect to a graphical user interface of the client device 102. The graphical representation apparatus 120 may receive the feedback data 702 from the client devices 102 via the network 104.

The graphical representation apparatus 120 may utilize the feedback data 702 to update or modify graph embedding structures, machine learning models, deep learning models, predictive inferences, or the like. For example, the graphical representation apparatus 120 may utilize the feedback data 702 to tune one or more weights of the deep learning model 121 based on the feedback data 702. In some embodiments, feedback data 702 is used to remove spurious edges and/or modify incorrect information of graph data. In some embodiments, the feedback data 702 may be utilized to modify and/or finetune weights of the deep learning model 121. In some embodiments, the feedback data 702 may be utilized to update one or more portions of the graph embedding structure based on the feedback data 702. Updating the graph data and/or the deep learning model 121 using feedback data 702 may enable the information stored by the graph data and the predictive inferences 304 to dynamically change over time and account for new information or correct spurious information.

Figure 8:
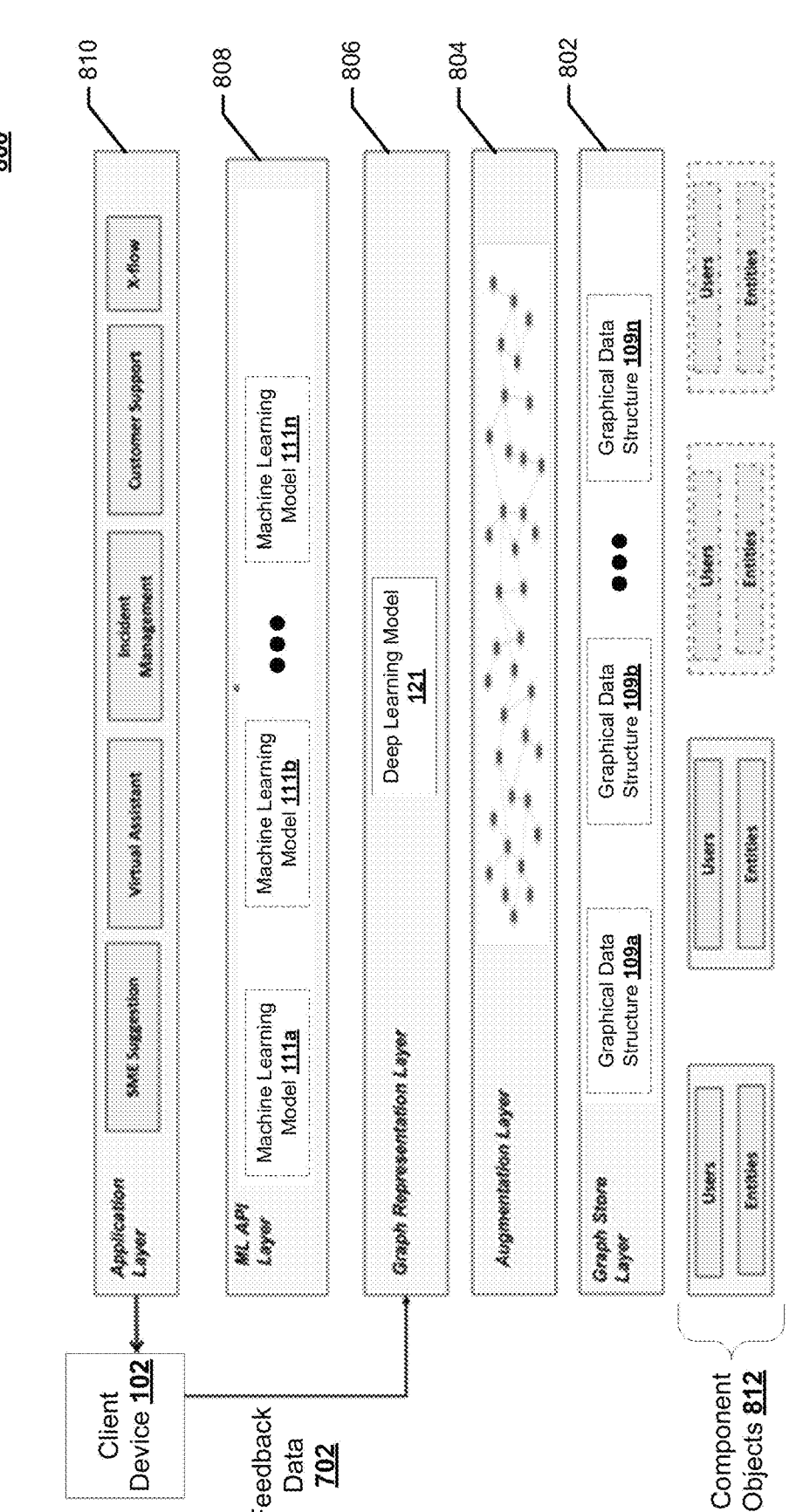
FIG. 8 illustrates an example system related to layers of an application framework in accordance with one or more embodiments of the present disclosure.

Referring to FIG. 8, an example system 800 is presented in accordance with one or more embodiments of the present disclosure. The system 800 includes a graph store layer 802, an augmentation layer 804, a graph representation layer 806, a machine learning (ML) API layer 808, and/or an application layer 810. The graph store layer 802, the augmentation layer 804, the graph representation layer 806, the ML API layer 808, and/or the application layer 810 may be respective layers of the application framework 106. In some embodiments, the layers may be physical layers, data link layers, network layers, presentation layers, and/or application layers of the application framework 106.

In some embodiments, the graph store layer 802 transforms component objects 812 into respective graphical data structures 109*a-n*. For example, the component objects 812 may be disparate data related to the application framework 106. In some embodiments, the component objects 812 can be related to users and/or entities of the application framework 106. Additionally or alternatively, the component objects 812 may be related to events, actions, interactions, and/or collaborations with respect to users and/or entities of the application framework 106. In some embodiments, the component objects 812 may be related to one or more collaborative applications, one or more service management applications, one or more project management applications, one or more work management applications, one or more software development applications, one or more product development applications, one or more portfolio management applications, and/or one or more other types of applications managed by the application framework 106.

In some embodiments, the augmentation layer 804 augments data of the respective graphical data structures 109*a-n* to facilitate deep learning of the data via the graph representation layer 806. The graph representation layer 806 may utilize the deep learning model 121 to perform the deep learning related to the respective graphical data structures 109*a-n*. In various embodiments, the graph representation layer 806 may utilize the deep learning model 121 to generate one or more graph embedding structures (e.g., the graph embedding structure 302) for utilization via the ML API layer 808. For example, the ML API layer 808 may provide the one or more graph embedding structures as input to one or more machine learning models 111*a-n*. The application layer 810 may utilize one or more predictive insights related to the one or more machine learning models 111*a-n* to provide one or more services and/or microservices the client device 102. The one or more services and/or microservices may include SME suggestions, a virtual agent, incident management, customer support, workflow management, cross-flow management, etc. In some embodiments, the client device 102 may provide feedback data (e.g., the feedback data 702) to the graph representation layer 806 to facilitate updates to the one or more graph embedding structures and/or the deep learning model 121.

In some embodiments, the ML API layer 808 includes a collaborative filtering API that determines one or more user identifiers closest to a particular user identifier associated with the graph embedding structure 302 based on a set of preferences related to the particular user identifier. For example, the ML API layer 808 can include a machine learning model 111 that determines users having a similar graph embedding structure to the graph embedding structure 302.

In some embodiments, the ML API layer 808 includes a community detection API that identifies communicates within the deep learning model 121 such that the ML API layer 808 can recommend one or more digital collaboration articles from a same community as a particular user identifier associated with the graph embedding structure 302.

In some embodiments, the ML API layer 808 includes a content-based filtering API that determines one or more digital collaboration articles similar to a recently accessed digital collaboration article by a particular user identifier associated with the graph embedding structure 302. For example, the ML API layer 808 can include a machine learning model 111 that determines the one or more digital collaboration articles similar to the recently accessed digital collaboration article based on topics, headings, and/or other digital collaboration data included in graph data of the deep learning model 121.

In some embodiments, the ML API layer 808 includes an information technology service management (ITSM) API that predicts whether a particular user identifier associated with the graph embedding structure 302 may be utilized as a subject matter expert for an incident and/or service request. For example, the ML API layer 808 can include a machine learning model 111 that predicts a link between an incident and a particular user identifier based on graph embedding structures provided by the deep learning model 121. The machine learning model 111 can additionally provide a confidence value associated with the prediction for the link between the incident and the particular user identifier.

Figure 9A:
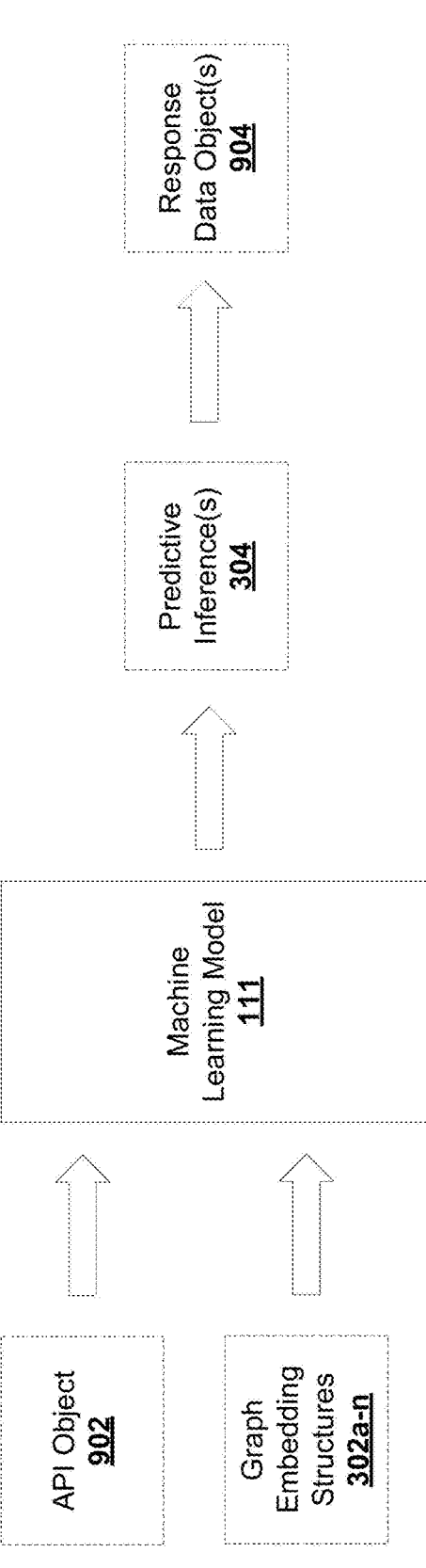
FIG. 9A illustrates an example data flow related to a machine learning model in accordance with one or more embodiments of the present disclosure.

Referring to FIG. 9A, an example data flow 900 is presented in accordance with one or more embodiments of the present disclosure. The data flow 900 depicts functionality between the various sub-systems of the system architecture 100, including the graphical representation apparatus 120, the one or more machine learning models 111, and/or the one or more client devices 102*a-n*.

In one or more embodiments, the graphical representation apparatus 120 receives an API object 902. The API object 902 may be received from a client device 102 via one or more communication channels of the network 104. The communication channel may correspond to an API communication channel, an email communication channel, a network portal interface communication channel, a user interface widget communication channel, a chat communication channel, or another type of communication channel. In various embodiments, the API object 902 may define a feature dataset associated with an API request for the application framework 106. In various embodiments, the API request is related to the one or more machine learning models 111.

In a non-limiting example, the API object 902 may define a feature dataset associated with a request for suggesting a most relevant article for a user identifier. For example, the feature dataset may include at least one or more user features (e.g., a user identifier for a user associated with a client device 102, etc.) and/or one or more article features (e.g., a page identifier for a page in which the user is currently browsing via user interface of the client device 102, etc.). In a non-limiting example, the API object 902 may define a feature dataset associated with an ITSM request for determining a resolution action for an incident related to the application framework 106. For example, the feature dataset may include at least one or more features and/or attributes related to the incident. In some embodiments, the feature dataset associated with the ITSM request can include one or more features related to an owner of a service affected by the incident, authors of deployments and/or commits with respect to the affected service, downstream and/or upstream services dependent on the affected service, approvers of change requests with respect to affected services and/or dependent services, a user who recently resolved a similar incident, an author of a digital collaboration page which includes information regarding a resolution for a problem related to the incident, and/or one or more other types of features related to the incident.

Based at least in part on the API object 902 and/or a set of graph embedding structures 302*a-n*, the graphical representation apparatus 120 may utilize at least one machine learning model 111 to generate the one or more predictive inferences 304. For example, the graphical representation apparatus 120 may apply the machine learning model 111 to the API object 902 and/or the set of graph embedding structures 302*a-n* to generate the one or more predictive inferences 304. In certain embodiments, the graphical representation apparatus 120 may apply the machine learning model 111 to the feature dataset for the API object 902 and/or the set of graph embedding structures 302*a-n* to generate the one or more predictive inferences 304. The set of graph embedding structures 302*a-n* may include one more graph embedding structures (e.g., at least the graph embedding structure 302) for a portion of graph data associated with a respective entity identifier to generate one or more predictive inferences related to the API object 902. The graph data may be related to the one or more graphical data structures 109 stored in the graph store 107. For example, the graph data may graphically represent relationships between component objects related to the application framework 106. Additionally, the graph embedding structures of the set of graph embedding structures 302*a-n* may respectively represent an encoded version of one or more of the relationships for the respective entity identifier. The entity identifier may correspond to a user identifier, a machine learning model identifier, a machine learning model task identifier, a component identifier, an event identifier, an incident identifier, and/or another type of identifier associated with the application framework 106.

In certain embodiments, the one or more predictive inferences 304 may include a label for the API object 902. The label may be, for example, a data label, a classification, a target class, a prediction, an inference, a tag, a sentiment, a word embedding, a data vector, or another type of label associated a respective intent with respect to the API object 902. In some embodiments, the label for the API object 902 is a relevancy label, a resolution label (e.g., a support label), or another type of label for the API object 902.

In certain embodiments, the machine learning model 111 may be configured to perform one or more clustering techniques based on the API object 902 and/or the set of graph embedding structures 302*a-n* to generate the label for the API object 902. In certain embodiments, the label for the API object 902 may include a classification for respective request types. For example, a support label for the API object 902 may include a list of categories related to support requests, where the respective categories in the list of categories correspond to a potential issue and/or workflow to resolve the issue. In certain embodiments, the machine learning model 111 may employ a sentence encoder (e.g., a universal sentence encoder) to perform the one or more clustering techniques and/or to classify data in the API object 902. For example, text included in the API object 902 may be encoded into embedding vectors employed for text classification, semantic understanding, clustering, and/or natural language processing related to the machine learning model 111.

In various embodiments, the graphical representation apparatus 120 may generate one or more response data objects 904 based on the one or more predictive inferences 304. The one or more response data objects 904 may be respectively related to one or more actions with respect to a client device 102, a user interface of a client device 102, the application framework 106, and/or the one or more machine learning models 111. For example, the one or more actions may be one or more automated actions with respect to the application framework 106 and/or the one or more client devices 102*a-n*. In certain embodiments, the one or more actions may include generation and/or transmission of a message, an alert, a notification, a control signal, an API call, an email message, an application portal communication, a widget communication, a chat channel communication, a web communication, API calls, a set of executable instructions, a workflow, a resolution ticket, visual data, the like, or combinations thereof associated with the one or more response data objects 904. Additionally or alternatively, the one or more actions may be associated with one or more workflow events with respect to one or more components of the application framework 106. Additionally or alternatively, the one or more actions may be associated with updating one or more parameters and/or weights of the one or more machine learning models 111 to improve predictions provided by the one or more machine learning models 111. In one embodiment, the one or more actions may include generating a message for a client device from the one or more client devices 102*a-n* based at least in part on the respective response data objects 904. The message may be configured, for example, to render visual data associated with the respective response data objects 904 via a user interface of the client device. For example, the visual data may be related to a suggested relevant article and/or a list of recommended articles for a user identifier. In another example, the visual data may be related to a resolution and/or a ranked list of recommended resolutions for an incident. In another embodiment, the one or more actions may include routing a resolution ticket data object to a support device based at least in part on the respective response data objects 904.

The following non-limiting scenarios demonstrate various uses and other embodiments related to the one or more response data objects 904.

In certain embodiments related to incident management, the application framework 106 includes a search engine application that experiences an incident. Other components of the application framework 106 may include a crawler service, a tokenizer, an indexer service, and/or a storage service. In certain embodiments, there may be several teams with multiple user identifiers related to the application framework 106. In some embodiments, there may be an incident related to the indexer service and in response the team best suited to handle the incident needs to be identified. For example, team-A may be in charge of the indexer service and worked on the module for two years. Accordingly, team-A may have the most connections to the indexer service. However, team-A may transferred their knowledge and responsibility of the indexer service to team-B within the last six months such that team-A, despite having the maximum connections to the indexer service, is not the optimal team for the API object 902. Further complicating the situation, team-C may have worked on the tokenizer module. Historic data reveals that in past similar incidents, whenever there is an issue with the indexer service, the tokenizer module was the root cause of bugs that affected the indexer service which is downstream of the tokenizer. Taking this causal dependency into account, team-C may be identifiable as the optimal team to handle an incident related to the API object 902.

In various embodiments, the one or more machine learning models 111 may be utilized in accordance with various embodiments described herein to leverage a graph embedding structure that captures the impacts and varying degree of importance, recency, etc. to determine the relative relevance score of each result. For example, the one or more machine learning models 111 may be utilized to answer questions like what changes have happened in a given service between a given time interval, how many high memory alerts occurred between a given time interval for a given service, which teams have been assigned incidents related to a service for a given time interval, is there an increasing trend in a given type of incident, etc.

In certain embodiments, a virtual agent of the application framework 106 may include an API configured to apply the one or more machine learning models 111 to a graph embedding structure in accordance with various embodiments described herein. This may enable the API to help bring together an optimal set of users and/or components across a variety of options. In certain embodiments, the virtual agent of the application framework 106 may assist in asking the right disambiguating questions so as to point the user to the correct resolution. In contrast, a traditional one-shot resolution technique applied to advanced or complex incidents often fails as there is not enough initial information to get to the right solution. Instead, an incident resolution may require additional information to pinpoint the problem first. For example—"laptop crashed" may have multiple solutions depending on what type of laptop it is and what kind of firmware/operating system is installed. In certain embodiments, the virtual agent of the application framework 106 may be utilized to identify the constraints connecting the symptom (server crashed) to the resolution(s) and thereby assist in asking the right questions before generating an answer. Additionally, in certain embodiments, the virtual agent of the application framework 106 may provide guardrails on generated content by performing fact checks and reconciliation. For example, the snippet search may result in two snippets of information which are mutually contradictory. As such the virtual agent of the application framework 106 may be utilized to identify which of the two sources are more reliable for generating the response.

In another non-limiting example, consider a scenario where a virtual agent is provided with service tickets from end users of a service. The service tickets may describe a service disruption. As such, a virtual agent of the application framework 106 may in accordance with embodiments described herein may provide a solution by finding a closest match across multiple paths of a graphical data structure via a corresponding graph embedding structure. Additionally, a virtual agent of the application framework 106 may identify collaborators from similar incidents in the past which may give immediate insights into the root cause and how it may be resolved. Further, a virtual agent of the application framework 106 may identify experts in the domain by inferring from various connected components. In certain embodiments, a virtual agent of the application framework 106 may be used to provide information and collaborative insights in a single system to bring down the communication barrier across multiple teams which will otherwise work in silos.

In yet another non-limiting example related to portal customization, a help center portal customization may be utilized by the application framework 106. The help center portal customization may involve recommendation of the correct articles and resources to the end user. Traditionally, this may be accomplished by understanding complex relationships between users as well as between users and entities (e.g. knowledge base articles). However, these relationships are complex and cannot be easily determined using simple graphs or relational databases. For example, in a case where a new user (user1) is in a portal, recommendations to user1 may have to be based on other users (user2, user3) who are very similar to user1. Consider the following: user3 and user1 have collaborated on issues 50 times in the past but only 5 times in the recent 2 weeks. User2 and user1 have collaborated only 20 times, but all of them in the recent 1 week. User3 has created a deployment which recently fixed an issue which user1 was working on. User2 has created a knowledge base article which was liked by user1 recently. In such a case, there are various degrees of influence and different types of relationships between the users (user1, user2, user3). The matter of how to rank the users based on their interactions cannot reasonably be done using simple graphical relationships without machine learning. Various embodiments described herein thereby resolve such a matter by leveraging the graphical representation apparatus 120 to apply the one or more machine learning models 111 to a graph embedding structure where the graph embedding structure captures the information of the graphical relationships in a format usable by the machine learning models 111.

In yet another non-limiting example, related to a support query, the graphical representation apparatus 120 may be utilized to identify virtual agents which have previously interacted with the particular user identifier and/or have customer satisfaction scores that satisfy quality criterion. Figure out which agents have experience handling similar queries. Determine and provide all necessary context for answering the customer query based on previous interactions on similar queries from that customer or from other customers. For example, the graphical representation apparatus 120 may be utilized to determine an optimal user identifier user to handle the API object 902 (e.g., a customer support personnel that has assisted a particular user identifier in the past, customer support personnel that have assisted with a similar query for a different user identifier and has an optimal quality score, etc.).

Referring to FIG. 9B, an example data flow 950 is presented in accordance with one or more embodiments of the present disclosure. The data flow 900 depicts functionality between the various sub-systems of the system architecture 100, including the graphical representation apparatus 120, the one or more machine learning models 111, and/or the one or more client devices 102*a-n*.

In one or more embodiments, the graphical representation apparatus 120 receives a service message object 952. The service message object 952 may be received from a client device 102 via one or more communication channels of the network 104. The communication channel may correspond to an email communication channel, a network portal interface communication channel, a user interface widget communication channel, a chat communication channel, an API communication channel, or another type of communication channel. In various embodiments, the service message object 952 may define a feature dataset associated with a service request for the application framework 106.

In a non-limiting example, the service message object 952 may define a feature dataset associated with a chat communication channel and/or chat communications related to a service request. In certain embodiments, the service message object 952 may include data related to service tickets and/or service messages provided to the application framework 106. In various embodiments, the service message object 952 may include data related to a service conversation that contains a collection of service messages. The service messages may be one or more stored service messages and/or one or more ongoing service messages with respect to the application framework system 105. In certain embodiments, the service message object 952 may be associated with a particular user identifier. For example, a service request signal may be received from a user identifier via a user interface of a client device associated with the user identifier.

Based at least in part on the service message object 952 and/or a set of graph embedding structures 302a-n, the graphical representation apparatus 120 may utilize at least one machine learning model 111 to generate the one or more predictive inferences 304. For example, the graphical representation apparatus 120 may apply the machine learning model 111 to the service message object 952 and/or the set of graph embedding structures 302a-n to generate the one or more predictive inferences 304. In certain embodiments, the graphical representation apparatus 120 may apply the machine learning model 111 to the feature dataset for the service message object 952 and/or the set of graph embedding structures 302a-n to generate the one or more predictive inferences 304. The set of graph embedding structures 302a-n may include one more graph embedding structures (e.g., at least the graph embedding structure 302) for a portion of graph data associated with a respective entity identifier to generate one or more predictive inferences related to the service message object 952. The graph data may be related to the one or more graphical data structures 109 stored in the graph store 107. For example, the graph data may graphically represent relationships between component objects related to the application framework 106. Additionally, the graph embedding structures of the set of graph embedding structures 302a-n may respectively represent an encoded version of one or more of the relationships for the respective entity identifier. The entity identifier may correspond to a user identifier, a machine learning model identifier, a machine learning model task identifier, a component identifier, and/or another type of identifier associated with the application framework 106.

In certain embodiments, the one or more predictive inferences 304 may include a support label for the service message object 952. The support label may be, for example, a data label, a classification, a target class, a prediction, an inference, a tag, a sentiment, a word embedding, a data vector, or another type of label associated a respective intent with respect to the service message object 952. In certain embodiments, the machine learning model 111 may be configured to perform one or more clustering techniques based on the service message object 952 and/or the set of graph embedding structures 302a-n to generate the support label for the service message object 952. In certain embodiments, the support label for the service message object 952 may include a classification for respective support request types. For example, the support label for the service message object 952 may include a list of categories related to support requests, where the respective categories in the list of categories correspond to a potential issue and/or workflow to resolve the issue. In certain embodiments, the machine learning model 111 may employ a sentence encoder (e.g., a universal sentence encoder) to perform the one or more clustering techniques and/or to classify data in the service message object 952. For example, text included in the service message object 952 may be encoded into embedding vectors employed for text classification, semantic understanding, clustering, and/or natural language processing related to the machine learning model 111.

In various embodiments, the graphical representation apparatus 120 may generate one or more resolution data objects 954 based on the one or more predictive inferences 304. The one or more resolution data objects 954 may be respectively related to one or more resolution actions. The one or more resolution actions may be one or more automated actions with respect to the application framework 106 and/or the one or more client devices 102a-n. In certain embodiments, the one or more resolution actions may include generation and/or transmission of a message, an alert, a notification, a control signal, an API call, an email message, an application portal communication, a widget communication, a chat channel communication, a web communication, API calls, a set of executable instructions, a workflow, a resolution ticket, visual data, the like, or combinations thereof associated with the one or more resolution data objects 954. Additionally or alternatively, the one or more resolution actions may be associated with one or more workflow events with respect to one or more components of the application framework 106. In one embodiment, the one or more resolution actions may include generating a resolution message object for a client device from the one or more client devices 102a-n based at least in part on the respective resolution data objects 954. The resolution message object may be configured, for example, to render visual data associated with the respective resolution data objects 954 via a user interface of the client device. In another embodiment, the one or more resolution actions may include routing a resolution ticket data object to a support device based at least in part on the respective resolution data objects 954.

Figure 10:
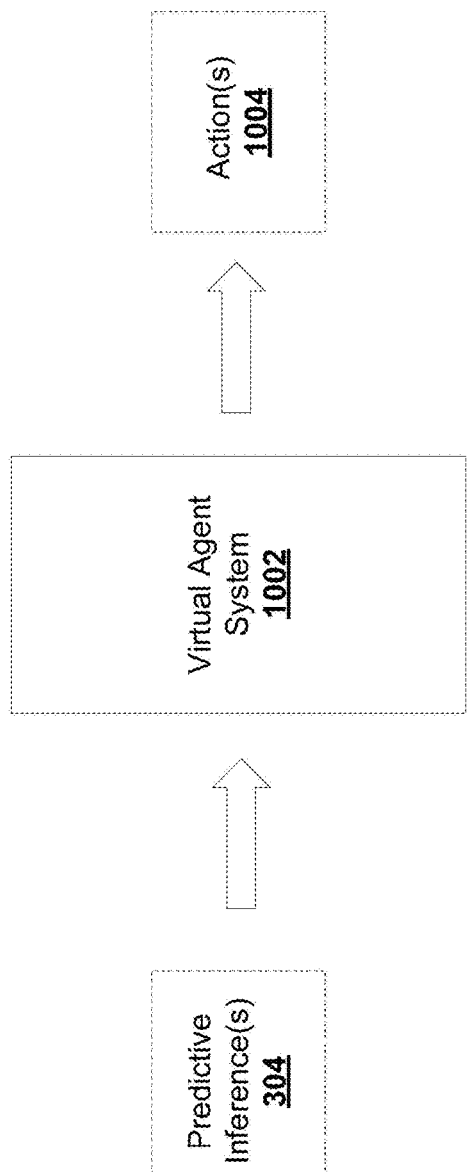
FIG. 10 illustrates an example data flow related to a virtual agent system in accordance with one or more embodiments of the present disclosure.

Referring to FIG. 10, an example data flow 1000 is presented in accordance with one or more embodiments of the present disclosure. The data flow 1000 depicts functionality between the various sub-systems of the system architecture 100, including the graphical representation apparatus 120, the application framework system 105, the machine learning API system 110, the one or more machine learning models 111, and/or the one or more client devices 102a-n.

In one or more embodiments, a virtual agent system 1002 receives the one or more predictive inferences 304 from the one or more machine learning models 111 to initiate one or more actions 1004. In certain embodiments, the virtual agent system 1002 includes one or more virtual agent artificial intelligence (AI) models. Additionally or alternatively, in certain embodiments, the virtual agent system 1002 includes an AI virtual agent engine. In certain embodiments, the one or more virtual agent AI models may be trained to recognize support intentions related to service tickets, service messages, workflow actions, software events, incidents, changes, component requests, alerts, notifications, and/or other data associated with an application framework. In certain embodiments, the one or more virtual agent AI models may be configured as an AI virtual agent engine for the application framework 106 to automate support interactions with respect to the application framework 106 via various communication channels such as a portal, chat, email, web, text, notification, telephone, video, and/or other channels. In various embodiments, the one or more virtual agent AI models may utilize a natural language processing engine may be employed to learn from the various communication channels and/or data provided therefrom. In one or more embodiments, the one or more virtual agent AI models may be configured to interpret intent, context, and/or sentiment related to the support interactions with respect to the application framework 106.

In certain embodiments, the virtual agent system 1002 may be configured to configured to interact with the one or more client devices 102*a-n* via queries and/or responses related to text, audio, imagery, and/or video content. In certain embodiments, the one or more actions 1004 correspond to one or more resolution actions (e.g., one or more automated actions) with respect to the application framework 106 and/or the one or more client devices 102*a-n*. For example, the one or more actions 1004 may include generation and/or transmission of a message, an alert, a notification, a control signal, an API call, an email message, an application portal communication, a widget communication, a chat channel communication, a web communication, API calls, a set of executable instructions, a workflow, a resolution ticket, visual data, the like, or combinations thereof with respect to the application framework 106 and/or the one or more client devices 102*a-n*.

Figure 11:
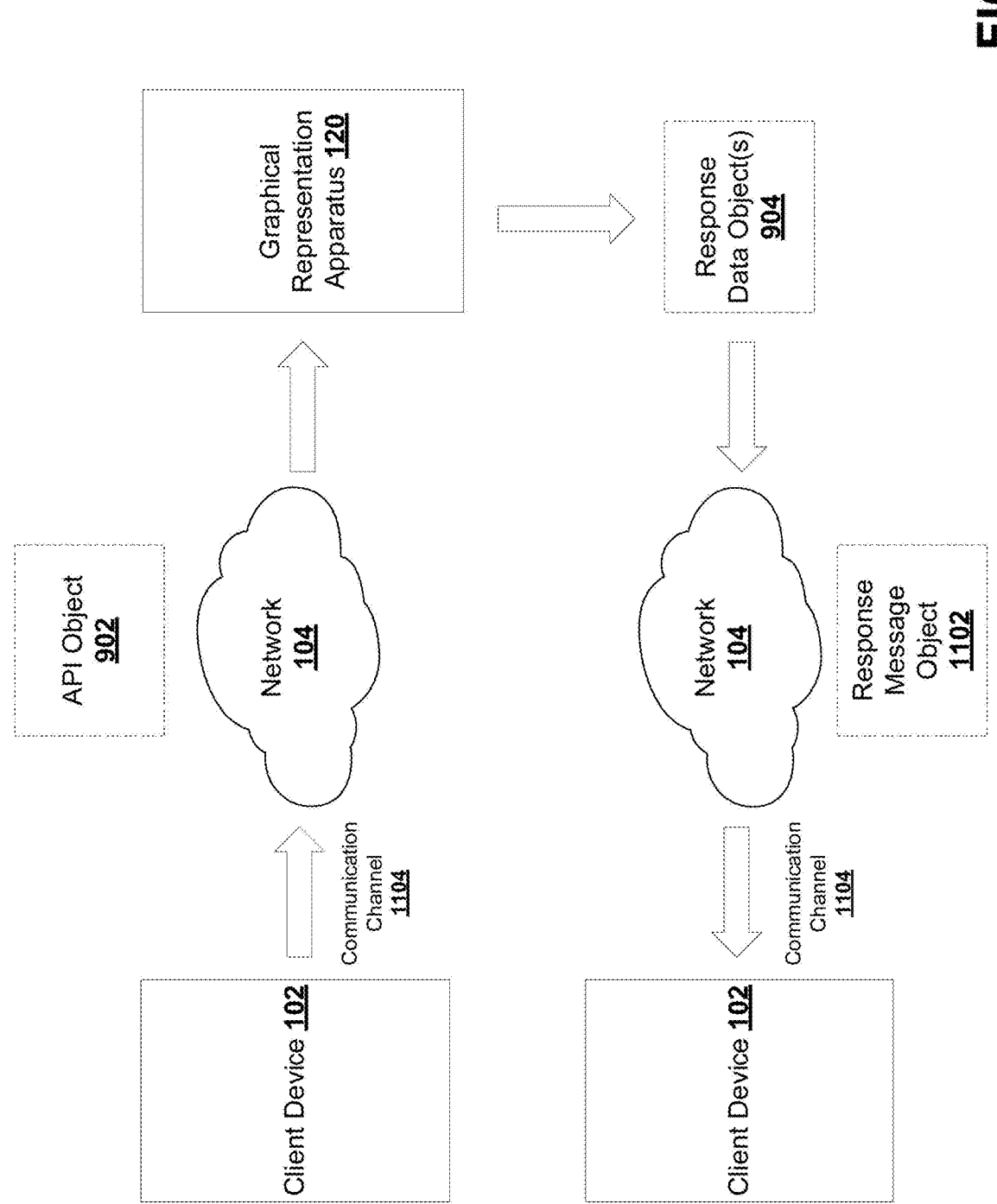
FIG. 11 illustrates an example data flow related to a service message object provided by a client device in accordance with one or more embodiments of the present disclosure.

Referring to FIG. 11, an example data flow 1100 is presented in accordance with one or more embodiments of the present disclosure. The data flow 1100 depicts functionality between the various sub-systems of the system architecture 100, including the graphical representation apparatus 120 and/or the one or more client devices 102*a-n*.

The client device 102 and/or the application framework 106 may initiate and/or cause transmission of the API object 902 to the graphical representation apparatus 120. In one or more embodiments, the client device 102 transmits the API object 902 to the graphical representation apparatus 120 via a communication channel 1104 associated with the network 104. The communication channel 1104 may be an API communication channel, an email communication channel, a network portal interface communication channel, a user interface widget communication channel, a chat communication channel, and/or another type of communication channel. In various embodiments, the graphical representation apparatus 120 may apply one or more machine learning models (e.g., the one or more machine learning models 111) to apply a machine learning model to the API object 902 and/or one or more graph embedding structures (e.g., the set of graph embedding structures 302*a-n*) to generate one or more predictive inferences related to the API object 902. Additionally, the graphical representation apparatus 120 may generate the one or more response data objects 904 based on the or more predictive inferences related to the API object 902.

In one or more embodiments, the graphical representation apparatus 120 may initiate one or more actions via an application layer of the application framework 106 based at least in part on the related to the API object 902. For example, the graphical representation apparatus 120 may initiate one or more actions via an application layer of the application framework 106 based at least in part on the one or more resolution data objects 954. In certain embodiments, the graphical representation apparatus 120 may initiate a response action related to the one or more response data objects 904. For example, in certain embodiments, the graphical representation apparatus 120 may transmit a response message object 1102 via the communication channel 1104. For example, the graphical representation apparatus 120 may transmit the response message object 1102 to the client device 102 via the communication channel 1104. In various embodiments, the response message object 1102 may represent a response message for the client device 102. The response message object 1102 may be configured based at least in part on the one or more predictive inferences and/or the one or more resolution data objects 954. In various embodiments, visual data related to the response message object 1102 may be rendered via an electronic interface of the client device 102. For example, a visualization that includes one or more interface elements related to the response message object 1102 may be rendered via an electronic interface of the client device 102.

FIG. 12 is a flowchart diagram of an example process 1200 for providing predictive inferences related to a graph representation of data via deep learning, in accordance with, for example, the graphical representation apparatus 120. Via the various operations of process 1200, the graphical representation apparatus 120 may enhance efficiency, reliability and/or effectiveness of the application framework 106 and/or the one or more machine learning models 111.

The process 1200 begins at operation 1202 where graph data of a graphical data structure is transformed into a graph feature set. In some embodiments, the graphical data structure graphically represents collaboration relationships between component objects related to a multi-component system of an application framework. In some embodiments, the graph feature set includes one or more features associated with the graph data and the component objects. At operation 1204, a deep learning model is applied to the graph feature set to generate a graph embedding structure for a portion of the graph data associated with a user identifier. In some embodiments, the graph embedding structure represents an encoded version of the collaboration relationships for the user identifier. In some embodiments, the deep learning model is a GNN model and the GNN model is applied to the graph feature set to generate the graph embedding structure. At operation 1206, the graph embedding structure is provided to one or more machine learning models configured to generate one or more predictive inferences related to the graph data.

In some embodiments, the graph embedding structure includes a linearized vector data structure that represents the collaboration relationships for the user identifier in a defined format for the one or more machine learning models.

In some embodiments, one or more entities are extracted from the graph data via natural language processing. Additionally or alternatively, the graph feature set is augmented with data associated with the one or more entities to generate an augmented graph features set. Additionally or alternatively, the deep learning model is applied to the augmented graph feature set to generate the graph embedding structure.

In some embodiments, the graph data is transformed into an into an adjacency list structure that represents the graph data as a set of linked lists that respectively represent a particular relationship between nodes of the graph data. Additionally or alternatively, the graph feature set is generated based on the adjacency list structure.

In some embodiments, feedback data from a client device based on the one or more predictive inferences related to the graph data. Additionally or alternatively, one or more portions of the graph embedding structure is updated based on the feedback data. Additionally or alternatively, one or more weights of the deep learning model is tuned based on the feedback data.

FIG. 13 is a flowchart diagram of an example process 1300 for providing predictive inferences related to a graph representation of data via an application programming interface, in accordance with, for example, the graphical representation apparatus 120. Via the various operations of process 1300, the graphical representation apparatus 120 may enhance efficiency, reliability and/or effectiveness of the application framework 106 and/or the one or more client devices 102*a-n*.

The process 1300 begins at operation 1302 where an API object is received via a communication channel. The API object may define a feature dataset associated with an API request for an application framework. The communication channel may correspond to an API communication channel, an email communication channel, a network portal interface communication channel, a user interface widget communication channel, a chat communication channel, and/or another type of communication channel.

At operation 1304, a machine learning model is applied to the API object and/or one or more graph embedding structures to generate one or more predictive inferences related to the API object. The graph data may graphically represent relationships between component objects related to the application framework. Additionally, the one or more graph embedding structures may respectively represent an encoded version of one or more of the relationships for the respective entity identifier. In some embodiments, the one or more graph embedding structures are received from a deep learning model configured to apply deep learning to a graph feature set that comprises one or more features associated with the graph data and the component objects to generate the graph embedding structure. In some embodiments, the one or more graph embedding structures may be received from a GNN model configured to apply deep learning to the graph data to generate the graph embedding structure.

At operation 1306, a response action related to the API object may be initiated based at least in part on the one or more predictive inferences. In some embodiments, one or more actions are initiated via an application layer of the application framework based at least in part on the one or more predictive inferences. In some embodiments, one or more actions are initiated via a virtual agent system based at least in part on the one or more predictive inferences. In some embodiments, a response data object for a client device is transmitted via the communication channel based at least in part on the one or more predictive inferences.

In some embodiments, the API object is a service message object that defines the feature dataset for a service request for the application framework. In some embodiments, the machine learning model is applied to the service message object and the one or more graph embedding structures to generate the one or more predictive inferences. Additionally or alternatively, the response action is initiated for the service request based at least in part on the one or more predictive inferences.

In some embodiments, the API object is a recommendation system object that defines the feature dataset for a relevancy request related to the component objects of the application framework. In some embodiments, the machine learning model is applied to the recommendation system object and the one or more graph embedding structures to generate the one or more predictive inferences. Additionally or alternatively, the response action is initiated for the relevancy request based at least in part on the one or more predictive inferences.

In some embodiments, the API object is compared to the one or more graph embedding structures using a scoring function associated with the machine learning model to generate the one or more predictive inferences.

In some embodiments, the API object is compared to the one or more graph embedding structures using a clustering technique associated with the machine learning model to generate the one or more predictive inferences.

In some embodiments, one or more patterns related to the one or more graph embedding structures are determined based on the feature dataset to generate the one or more predictive inferences. Additionally, in some embodiments, one or more future relationships related to the one or more graph embedding structures are predicted based on the feature dataset to generate the one or more predictive inferences.

FIG. 14 is a flowchart diagram of an example process 1400 for providing predictive inferences related to a graph representation of data via an application programming interface, in accordance with, for example, the graphical representation apparatus 120. Via the various operations of process 1400, the graphical representation apparatus 120 may enhance efficiency, reliability and/or effectiveness of the application framework 106 and/or the one or more client devices 102*a-n*.

The process 1400 begins at operation 1402 where a service message object is received via a communication channel. The service message object may define a feature dataset associated with a service request for an application framework. The communication channel may correspond to an API communication channel, an email communication channel, a network portal interface communication channel, a user interface widget communication channel, a chat communication channel, and/or another type of communication channel.

At operation 1404, a machine learning model is applied to the service message object and/or one or more graph embedding structures to generate one or more predictive inferences related to the service message object. The graph data may graphically represent relationships between component objects related to the application framework. Additionally, the one or more graph embedding structures may respectively represent an encoded version of one or more of the relationships for the respective entity identifier. In some embodiments, the one or more graph embedding structures are received from a deep learning model configured to apply deep learning to a graph feature set that comprises one or more features associated with the graph data and the component objects to generate the graph embedding structure. In some embodiments, the one or more graph embedding structures may be received from a GNN model configured to apply deep learning to the graph data to generate the graph embedding structure.

At operation 1406, a resolution action related to the service message object may be initiated based at least in part on the one or more predictive inferences. In some embodiments, one or more actions are initiated via an application layer of the application framework based at least in part on the one or more predictive inferences. In some embodiments, one or more actions are initiated via a virtual agent system based at least in part on the one or more predictive inferences. In some embodiments, a response data object for a client device is transmitted via the communication channel based at least in part on the one or more predictive inferences.

In some embodiments, the service message object is compared to the one or more graph embedding structures using a scoring function associated with the machine learning model to generate the one or more predictive inferences.

In some embodiments, the service message object is compared to the one or more graph embedding structures using a clustering technique associated with the machine learning model to generate the one or more predictive inferences.

In some embodiments, one or more patterns related to the one or more graph embedding structures are determined based on the feature dataset to generate the one or more predictive inferences. Additionally, in some embodiments, one or more future relationships related to the one or more graph embedding structures are predicted based on the feature dataset to generate the one or more predictive inferences.

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web components, web services, web microservices, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus comprising one or more processors and one or more storage devices storing instructions that are operable, when executed by the one or more processors, to cause the one or more processors to:

receive an application programming interface (API) object via a communication channel, wherein the API object defines a feature dataset associated with an API request for an application framework;

determine one or more graph feature sets that comprises one or more features associated with graph data that graphically represents relationships between component objects that respectively correspond to an application component of the application framework;

apply a graph neural network model to the one or more graph feature sets to generate one or more graph embedding structures for utilization by a machine learning model;

apply the machine learning model to (i) the API object and (ii) the one or more graph embedding structures for a portion of the graph data associated with a respective entity identifier to generate one or more predictive inferences related to the API object, wherein the one or more graph embedding structures respectively represent an encoded version of one or more of the relationships for the respective entity identifier; and initiate a response action for the API request based at least in part on the one or more predictive inferences.

2. The apparatus of claim 1, wherein the API object is a service message object that defines the feature dataset for a service request for the application framework, wherein the one or more storage devices store instructions that are operable, when executed by the one or more processors, to further cause the one or more processors to:

apply the machine learning model to the service message object and the one or more graph embedding structures to generate the one or more predictive inferences, wherein the response action is initiated for the service request based at least in part on the one or more predictive inferences.

3. The apparatus of claim 1, wherein the API object is a recommendation system object that defines the feature dataset for a relevancy request related to the component objects of the application framework, wherein the one or more storage devices store instructions that are operable, when executed by the one or more processors, to further cause the one or more processors to:

apply the machine learning model to the recommendation system object and the one or more graph embedding structures to generate the one or more predictive inferences, wherein the response action is initiated for the relevancy request based at least in part on the one or more predictive inferences.

4. The apparatus of claim 1, wherein the one or more storage devices store instructions that are operable, when executed by the one or more processors, to further cause the one or more processors to:

compare the API object to the one or more graph embedding structures using a scoring function associated with the machine learning model to generate the one or more predictive inferences.

5. The apparatus of claim 1, wherein the one or more storage devices store instructions that are operable, when executed by the one or more processors, to further cause the one or more processors to:

compare the API object to the one or more graph embedding structures using a clustering technique associated with the machine learning model to generate the one or more predictive inferences.

6. The apparatus of claim 1, wherein the one or more storage devices store instructions that are operable, when executed by the one or more processors, to further cause the one or more processors to:

determine one or more patterns related to the one or more graph embedding structures based on the feature dataset to generate the one or more predictive inferences; and predict one or more future relationships related to the one or more graph embedding structures based on the feature dataset to generate the one or more predictive inferences.

7. The apparatus of claim 1, wherein the one or more storage devices store instructions that are operable, when executed by the one or more processors, to further cause the one or more processors to:

initiate one or more actions via an application layer of the application framework based at least in part on the one or more predictive inferences.

8. The apparatus of claim 1, wherein the one or more storage devices store instructions that are operable, when executed by the one or more processors, to further cause the one or more processors to:

initiate one or more actions via a virtual agent system based at least in part on the one or more predictive inferences.

9. The apparatus of claim 1, wherein the one or more storage devices store instructions that are operable, when executed by the one or more processors, to further cause the one or more processors to:

transmit, via the communication channel, a response message object for a client device based at least in part on the one or more predictive inferences.

10. The apparatus of claim 1, wherein the communication channel corresponds to an email communication channel, a network portal interface communication channel, a user interface widget communication channel, a chat communication channel, or an API communication channel.

11. A computer-implemented method, comprising:

receiving an application programming interface (API) object via a communication channel, wherein the API object defines a feature dataset associated with an API request for an application framework;

determining one or more graph feature sets that comprises one or more features associated with graph data that graphically represents relationships between component objects that respectively correspond to an application component of the application framework;

applying a graph neural network model to the one or more graph feature sets to generate one or more graph embedding structures for utilization by a machine learning model;

applying the machine learning model to (i) the API object and (ii) the one or more graph embedding structures for a portion of the graph data associated with a respective entity identifier to generate one or more predictive inferences related to the API object, wherein the one or more graph embedding structures respectively represent an encoded version of one or more of the relationships for the respective entity identifier; and initiating a response action for the API request based at least in part on the one or more predictive inferences.

12. The computer-implemented method of claim 11, wherein applying the machine learning model comprises:

comparing the API object to the one or more graph embedding structures using a scoring function associated with the machine learning model to generate the one or more predictive inferences.

13. The computer-implemented method of claim 11, wherein applying the machine learning model comprises:

comparing the API object to the one or more graph embedding structures using a clustering technique associated with the machine learning model to generate the one or more predictive inferences.

14. The computer-implemented method of claim 11, wherein applying the machine learning model comprises:

determining one or more patterns related to the one or more graph embedding structures based on the feature dataset to generate the one or more predictive inferences; and predicting one or more future relationships related to the one or more graph embedding structures based on the feature dataset to generate the one or more predictive inferences.

15. The computer-implemented method of claim 11, wherein initiating the resolution action comprises:

initiate one or more actions via an application layer of the application framework based at least in part on the one or more predictive inferences.

16. A computer program product, stored on a computer-readable storage medium, comprising instructions that when executed by one or more computers cause the one or more computers to:

receive an application programming interface (API) object via a communication channel, wherein the API object defines a feature dataset associated with an API request for an application framework;

determine one or more graph feature sets that comprises one or more features associated with graph data that graphically represents relationships between component objects that respectively correspond to an application component of the application framework;

apply a graph neural network model to the one or more graph feature sets to generate one or more graph embedding structures for utilization by a machine learning model;

apply the machine learning model to (i) the API object and (ii) the one or more graph embedding structures for a portion of the graph data associated with a respective entity identifier to generate one or more predictive inferences related to the API object, wherein the one or more graph embedding structures respectively represent an encoded version of one or more of the relationships for the respective entity identifier; and initiate a response action for the API request based at least in part on the one or more predictive inferences.

17. The computer program product of claim 16, wherein the API object is a service message object that defines the feature dataset for a service request for the application framework, and wherein the instructions further cause the one or more computers to:

apply the machine learning model to the service message object and the one or more graph embedding structures to generate the one or more predictive inferences, wherein the response action is initiated for the service request based at least in part on the one or more predictive inferences.

18. The computer program product of claim 16, wherein the API object is a recommendation system object that defines the feature dataset for a relevancy request related to the component objects of the application framework, and wherein the instructions further cause the one or more computers to:

apply the machine learning model to the recommendation system object and the one or more graph embedding structures to generate the one or more predictive inferences, wherein the response action is initiated for the relevancy request based at least in part on the one or more predictive inferences.

19. The computer program product of claim 16, wherein the instructions further cause the one or more computers to:

compare the API object to the one or more graph embedding structures using a scoring function associated with the machine learning model to generate the one or more predictive inferences.

20. The computer program product of claim 16, wherein the instructions further cause the one or more computers to:

compare the API object to the one or more graph embedding structures using a clustering technique associated with the machine learning model to generate the one or more predictive inferences.

\* \* \* \* \*